(12) United States Patent
Suga et al.

(10) Patent No.: US 12,157,601 B2
(45) Date of Patent: Dec. 3, 2024

(54) COMPOSITE PREFORM AND METHOD FOR PRODUCING THE SAME, COMPOSITE CONTAINER AND METHOD FOR PRODUCING THE SAME, AND COMPOSITE CONTAINER PRODUCT LOADED WITH BEER

(71) Applicant: Dai Nippon Printing Co., Ltd., Tokyo (JP)

(72) Inventors: Yusuke Suga, Tokyo (JP); Takuma Miyawaki, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 17/444,403

(22) Filed: Aug. 4, 2021

(65) Prior Publication Data
US 2021/0362901 A1  Nov. 25, 2021

Related U.S. Application Data

(62) Division of application No. 16/485,249, filed as application No. PCT/JP2018/006815 on Feb. 23, 2018, now Pat. No. 11,136,158.

(30) Foreign Application Priority Data

Feb. 23, 2017 (JP) ................................ 2017-032315
Feb. 23, 2017 (JP) ................................ 2017-032328
(Continued)

(51) Int. Cl.
*B65D 1/02* (2006.01)
*B29C 49/06* (2006.01)
(Continued)

(52) U.S. Cl.
CPC ............ *B65D 1/0215* (2013.01); *B29C 49/22* (2013.01); *B32B 1/00* (2013.01); *B65D 1/0207* (2013.01);
(Continued)

(58) Field of Classification Search
None
See application file for complete search history.

(56) References Cited

U.S. PATENT DOCUMENTS 3,984,005 A    10/1976  Amberg
4,604,257 A *  8/1986   Smith .................... B32B 27/36
                                                        264/513

(Continued)

FOREIGN PATENT DOCUMENTS

CN   103998203 A   8/2014
CN   105263693 A   1/2016
(Continued)

OTHER PUBLICATIONS

English machine translation for the description of JP-11348100-A obtained from ESPACENET (Year: 1999).*

(Continued)

*Primary Examiner* — James C Yager
*Assistant Examiner* — Thomas J Kessler
(74) *Attorney, Agent, or Firm* — BURR PATENT LAW, PLLC

(57) ABSTRACT

To provide a composite preform that can ensure that worsening of the appearance of a surface of a plastic member caused by near-infrared heating prior to blow molding is effectively prevented and that an inner preform is efficiently heated. The composite preform of the present invention includes a preform and a heat-contractive plastic member, the preform including a mouth part; a trunk part linked to the mouth part; and a bottom part linked to the trunk part, and (Continued)

the heat-contractive plastic member being disposed so as to surround the outside of the preform and including at least a colored layer that contains a resin material and a colorant, wherein the heat-contractive plastic member has a near-infrared transmittance of 50% or higher.

4 Claims, 14 Drawing Sheets

(30) Foreign Application Priority Data

| | | |
|---|---|---|
| May 1, 2017 | (JP) | 2017-091340 |
| May 1, 2017 | (JP) | 2017-091341 |
| May 1, 2017 | (JP) | 2017-091345 |

(51) Int. Cl.

| | |
|---|---|
| *B29C 49/22* | (2006.01) |
| *B29C 49/24* | (2006.01) |
| *B29K 67/00* | (2006.01) |
| *B29L 31/00* | (2006.01) |
| *B32B 1/00* | (2024.01) |
| *B65D 23/02* | (2006.01) |

(52) U.S. Cl.
CPC .............. *B65D 23/02* (2013.01); *B29C 49/06* (2013.01); *B29C 49/24* (2013.01); *B29C 2949/20* (2022.05); *B29C 2949/3016* (2022.05); *B29C 2949/302* (2022.05); *B29C 2949/3032* (2022.05); *B29C 2949/3048* (2022.05); *B29K 2067/003* (2013.01); *B29K 2995/0049* (2013.01); *B29L 2031/7158* (2013.01); *Y10T 428/1352* (2015.01); *Y10T 428/1372* (2015.01); *Y10T 428/1379* (2015.01)

(56) References Cited

U.S. PATENT DOCUMENTS

| | | | | |
|---|---|---|---|---|
| 5,968,616 | A | 10/1999 | Kakemura et al. | |
| 11,136,158 | B2 | 10/2021 | Suga et al. | |
| 11,213,992 | B2* | 1/2022 | Suga | B65D 1/0215 |
| 2002/0166833 | A1* | 11/2002 | David Shelby | B29C 49/24 |
| | | | | 264/516 |
| 2005/0051259 | A1 | 3/2005 | Luo | |
| 2006/0124239 | A1* | 6/2006 | Marshall | G09F 3/10 |
| | | | | 428/343 |
| 2011/0174356 | A1* | 7/2011 | Watanabe | H01L 31/049 |
| | | | | 252/582 |
| 2014/0203039 | A1* | 7/2014 | Maas | B05C 17/002 |
| | | | | 222/52 |
| 2014/0327176 | A1 | 11/2014 | Chiba et al. | |
| 2016/0136864 | A1 | 5/2016 | Miyawaki et al. | |
| 2017/0355125 | A1 | 12/2017 | Miyawaki et al. | |

FOREIGN PATENT DOCUMENTS

| | | | |
|---|---|---|---|
| EP | 1 742 785 | B1 | 1/2007 |
| JP | S60-147317 | A1 | 3/1985 |
| JP | 11348100 | A * | 12/1999 |
| JP | 2004-026291 | A1 | 1/2004 |
| JP | 2005-083743 | A1 | 3/2005 |
| JP | 2006-117269 | A | 5/2006 |
| JP | 2006-239885 | A | 9/2006 |
| JP | 2015-114583 | A1 | 6/2015 |
| JP | 2015-128858 | A1 | 7/2015 |
| JP | 2015-182793 | A1 | 10/2015 |
| JP | 2016-055523 | A1 | 4/2016 |
| JP | 2016-055524 | A | 4/2016 |
| JP | 2016-055895 | A1 | 4/2016 |
| JP | 2016-088603 | A1 | 5/2016 |
| JP | 2016-117167 | A1 | 6/2016 |
| JP | 2016-117170 | A1 | 6/2016 |
| JP | 2016-117199 | A | 6/2016 |
| JP | 2016-120692 | A1 | 7/2016 |
| JP | 2016-141400 | A1 | 8/2016 |
| KR | 10-0185216 | B1 | 4/1999 |
| KR | 10-2016-0024840 | A | 3/2016 |
| TW | 200510088 | A | 3/2005 |
| TW | 201637818 | A | 11/2016 |

OTHER PUBLICATIONS

Density of Plastics: Technical Properties, 2023, Omnexus, pp. 5-8 (Year: 2023).*
Japanese Office Action (Application No. 2021-010614) dated Nov. 19, 2021 (with English translation).
U.S. Office Action dated Nov. 25, 2022 (U.S. Appl. No. 17/444,406).
International Search Report and Written Opinion (Application No. PCT/JP2018/006815) dated Apr. 17, 2018.
English Translation of International Preliminary Report on Patentability (Chapter I) (Application No. PCT/JP2018/006815) dated Sep. 6, 2019.
Anonymous: "Transmission of Curves of Optics Materials—GS Plastic Optics", Oct. 29, 2020. Retrieved from Internet; URL: https://www/gsoptics.com/transmission-curves/.
Extended European Search Report (Application No. 18758071.7) dated Nov. 9, 2020.
Indian Office Action (Application No. 201917036307) dated Jan. 13, 2021 (with English translation).
Chinese Office Action (Application No. 201880012566.2) dated Feb. 5, 2021 (with English translation).
Korean Office Action (Application No. 10-2019-7026550) dated Apr. 7, 2021 (with English translation).
Taiwanese Office Action (Application No. 107106130) dated Apr. 30, 2021 (with English translation).
Japanese Office Action (Application No. 2017-091345) dated Jun. 4, 2021 (with English translation).
Korean Office Action (with English translation) dated Sep. 20, 2023 (Application No. 10-2023-7003051).

* cited by examiner

COMPOSITE PREFORM AND METHOD FOR PRODUCING THE SAME, COMPOSITE CONTAINER AND METHOD FOR PRODUCING THE SAME, AND COMPOSITE CONTAINER PRODUCT LOADED WITH BEER

CROSS REFERENCE TO RELATED APPLICATIONS

This application is a division of U.S. application Ser. No. 16/485,249, filed Aug. 12, 2019, which in turn is the National Stage entry of International Application No. PCT/JP2018/006815, filed Feb. 23, 2018, which designated the United States, and claims the benefit of Japanese Patent Application Nos. 2017-091345, 2017-091341 and 2017-091340, each filed May 1, 2017, and Japanese Application Nos. 2017-032328 and 2017-032315, each filed Feb. 23, 2017, the entireties of which are incorporated herein by reference.

FIELD OF THE INVENTION

The present invention relates to a composite preform and a method for producing the same, a composite container and a method for producing the same, and a composite container product loaded with beer.

BACKGROUND OF THE INVENTION

Recently, containers made of plastics have been more commonly used for containing drink or food.

A plastic container is produced by inserting a preform into a die and performing biaxial stretch blow molding on the preform.

According to a conventional biaxial stretch blow molding method, a preform containing a resin material such as PET or PP is molded to produce a container. However, in general, a conventional biaxial stretch blow molding method is used to merely mold a preform into the shape of a container. Thus, to give various functions or characteristics (e.g., barrier properties or heat retaining properties) to a container, limited methods are available, a typical example of which is changing the material included in the preform. In particular, it is difficult to give different functions or characteristics to different parts (e.g., trunk part and bottom part) of a container.

In view of the above-described problem, the present inventor proposed a composite container to which various functions and characteristics can be given in a previous application (Japanese Unexamined Patent Application Publication No. 2015-128858).

CITATION LIST

Patent Literature

Patent Literature 1: Japanese Unexamined Patent Application Publication No. 2015-128858

SUMMARY OF THE INVENTION

Technical Problem

The composite container disclosed in Japanese Unexamined Patent Application Publication No. 2015-128858 is produced by heating a composite preform with near-infrared rays, followed by blow molding performed on the composite preform, the composite preform including a preform and a heat-contractive plastic member disposed so as to surround the outside of the preform.

However, the composite container is problematic in that the heated region may be limited to the outer plastic member, depending on the type of the resin material or colorant contained in the plastic member. As a result, a surface of the plastic member may be melted to worsen the appearance. Moreover, the preform cannot be heated effectively, and thus there has been room for improvement of productivity thereof.

The present invention has been created on the basis of the foregoing knowledge, and an object of the invention is to provide a composite preform and a method for producing the same, a composite container, which is a blow-molded article of the composite preform, and a method for producing the same, and a product formed of the composite container and beer loaded therein, the composite preform being capable of ensuring that worsening of the appearance of a surface of a plastic member caused by near-infrared heating prior to the blow molding is effectively prevented and that the inner preform is efficiently heated.

The composite preform of the present invention includes a preform and a heat-contractive plastic member, the preform including a mouth part; a trunk part linked to the mouth part; and a bottom part linked to the trunk part, and the heat-contractive plastic member being disposed so as to surround the outside of the preform and including at least a colored layer that contains a resin material and a colorant, wherein the heat-contractive plastic member has a near-infrared transmittance of 50% or higher.

In one embodiment, the heat-contractive plastic member further includes a gas barrier layer.

In one embodiment, the colored layer includes a polyolefin-based resin.

In one embodiment, the colorant is a brown pigment and the content thereof is 0.1% to 30% by mass.

In one embodiment, the preform has a multi-layer structure including at least a gas barrier layer.

In one embodiment, one end of the plastic member on the bottom side of the preform is compression-bonded.

In one embodiment, the compression-bonded portion of the heat-contractive plastic member is twisted to form a twisted part.

The composite container of the present invention is a blow-molded article of the composite preform and includes a container body and a heat-contractive plastic member, the container body including: a mouth part, a neck part disposed below the mouth part; a shoulder part disposed below the neck part; a trunk part disposed below the shoulder part; and a bottom part disposed below the trunk part, and the heat-contractive plastic member being disposed in close contact with the outside of the container body and including at least a colored layer that contains a resin material and a colorant, wherein one end of the plastic member on the bottom side of the container body is compression-bonded to form a bottom part.

In one embodiment, the composite container has a visible light transmittance of 20% or less, the visible light having a wavelength of 400 to 500 nm.

In one embodiment, the composite container further includes a vapor-deposited film formed on an inner surface of the container body.

In one embodiment, the composite container has an oxygen transmission rate of 0.5 cc/m²·day·0.21 atm or less.

A method for producing the composite preform according to the present invention includes the steps of: preparing the preform and the heat-contractive plastic member; fitting the preform into the heat-contractive plastic member from one end of the plastic member; thermocompression-bonding a margin part of the heat-contractive plastic member; and heating the preform and the heat-contractive plastic member to cause the heat-contractive plastic member to heat-contract.

In one embodiment, the method for producing the composite preform further includes the step of twisting the thermocompression-bonded margin part to form a twisted part.

In one embodiment, the method for producing the composite preform further includes the step of preheating the preform prior to the fitting step.

A method for producing the composite container according to the present invention includes the steps of: heating the composite preform while inserting the composite preform into a blow molding die; and integrally inflating the preform and the plastic member by performing blow molding on the composite preform that has been heated.

A product according to the present invention is the composite container that is loaded with beer and has a cap attached on the mouth part of the container body.

Advantageous Effects of the Invention

The present invention provides a composite preform and a method for producing the same, a composite container, which is a blow-molded article of the composite preform, and a method for producing the same, and a product formed of the composite container and beer loaded therein, the composite preform being capable of ensuring that worsening of the appearance of a surface of a plastic member caused by near-infrared heating prior to the blow molding is effectively prevented and that the preform is efficiently heated.

DETAILED DESCRIPTION OF THE INVENTION

Composite Preform 70

Figure 1:
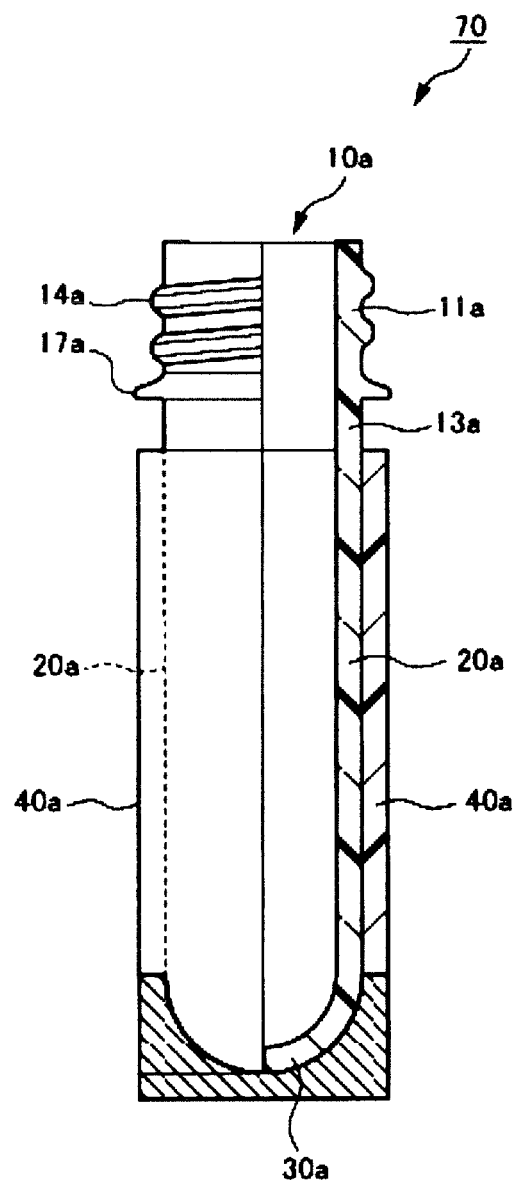
FIG. 1 is a partial vertical cross-sectional view of a composite preform according to one embodiment of the present invention.

In one embodiment, as illustrated in FIG. 1, a composite preform 70 includes a preform 10a and a heat-contractive plastic member 40a disposed so as to surround the outside of the preform 10a.

A composite container 10A is obtained by performing biaxial stretch blow molding on the composite preform 70 to integrally inflate the preform 10a and the heat-contractive plastic member 40a that are included in the composite preform 70.

Preform 10a

As illustrated in FIG. 1, the preform 10a includes a mouth part 11a, a trunk part 20a, which is linked to the mouth part 11a, and a bottom part 30a, which is linked to the trunk part 20a. Among these components, the mouth part 11a corresponds to the mouth part 11 of the above-described container body 10 and has a shape substantially identical to the mouth part 11. The trunk part 20a, which corresponds to the neck part 13, the shoulder part 12, and the trunk part 20 of the above-described container body 10, has a substantially cylindrical shape. The bottom 30a, which corresponds to the bottom part 30 of the above-described container body 10, has a substantially hemispherical shape.

The preform 10a included in the composite preform 70 of the present invention may have a single-layer structure or a multi-layer structure.

Each layer included in the preform 10a may contain a resin material, examples of which include thermoplastic resins, specifically polyethylene (PE), polypropylene (PP), polyethylene terephthalate (PET), polyethylene naphthalate (PEN), polycarbonate (PC), and ionomers. Such layers may also contain blended resins obtained by blending the various resins listed above.

Each of the layers included in the preform 10a may contain any of various additives to the extent that characteristics of the present invention remain intact. Examples of the additives include plasticizers, ultraviolet stabilizers, color protectors, delusterants, deodorants, flame retardants, weatherproofers, anti-static agents, anti-yarn friction agents, slip agents, release agents, antioxidants, ion exchange agents, dispersants, ultraviolet absorbers, and coloring pigments.

Each of the layers included in the preform 10a may contain a colorant of red, blue, yellow, green, brown, black, white, or the like; however, in view of recyclability, these layers are preferably clear and colorless without containing any of such colorants.

In one embodiment, the preform 10a has a multi-layer structure including at least a gas barrier layer. The preform 10a may include two or more gas barrier layers and, in this case, the individual layers may be the same or different in configuration, thickness, and so on.

The gas barrier layer contains a resin having gas barrier properties, example of which resin include meta-xylene adipamide (MXD-6), nylon 6, nylon 6,6, nylon 6/nylon 6,6 copolymer, ethylene-vinyl acetate copolymer (EVA), ethylene-vinyl alcohol copolymer (EVOH), polyglycolic acid (PGA), polyvinylidene chloride copolymer (PVDC), polyacrylonitrile, polyvinyl alcohol (PVA), polytetrafluoroethylene (PTFE), and styrene-isobutylene-styrene copolymer. The gas barrier layer may contain two or more of the above-listed resins having gas barrier properties.

The content of a resin having gas barrier properties is preferably 50% by mass or more, more preferably 90% by mass or more, in the gas barrier layer. A resin with gas barrier properties contained within the aforementioned numerical ranges can further improve gas barrier properties of the composite container 10A.

The gas barrier layer may contain resin materials other than the resins having gas barrier properties to the extent that characteristics of the gas barrier layer are not impaired. Examples of the other resins include polyester-based resins such as polyethylene terephthalate (PET), polybutylene terephthalate (PBT), and polyethylene naphthalate (PEN); polyolefin-based resins such as polyethylene (LDPE, MDPE, HDPE, LLDPE), polypropylene (PP), ethylene-propylene copolymer, poly-4-methylpentene, and poly-1-butene; vinyl-based resins such as vinyl chloride homopolymer, vinylidene chloride homopolymer, vinyl chloride-vinyl acetate copolymer, copolymer of either vinyl chloride or vinylidene chloride and a maleic acid derivative, higher alkyl vinyl ether, and so on; and ionomer resins.

In one embodiment, the gas barrier layer contains a pro-oxidant. The pro-oxidant is not limited to any specific agent as long as the pro-oxidant accelerates a reaction between molecular oxygen and an oxygen absorber that can be autoxidized by molecular oxygen, and examples thereof include radical generators, photooxidative catalysts, and transition metal salts. Transition metal salts are preferred among others because a transition metal salt even in a small amount can exert a satisfactory effect. The gas barrier layer containing a pro-oxidant accelerates oxidation of an oxygen absorber that can be autoxidized by molecular oxygen, thereby improving the oxygen absorbance capacity.

Examples of a metal salt include inorganic salts, organic salts, and complex salts. Examples of inorganic salts include halogenated salts, oxysalts, oxyacid salts, and silicate salts. Examples of organic salts include carboxylate salts, sulfonic acid salts, and phosphonic acid salts. Examples of complex salts include a complex with β-diketone or β-keto acid ester.

The content of a pro-oxidant in the gas barrier layer is preferably 0.001% to 3% by mass, more preferably 0.005% to 2% by mass, and still more preferably 0.01% to 1.5% by mass. A pro-oxidant contained within these numerical ranges can improve gas barrier properties of the gas barrier layer while maintaining the transparency thereof.

The gas barrier layer may contain an oxygen absorber. Examples of the oxygen absorber include ferrous oxygen absorbers and non-ferrous oxygen absorbers, and using a non-ferrous oxygen absorber is more preferable because the transparency of the preform 10a can be maintained.

Examples of ferrous oxygen absorbers include iron powder such as reduced iron powder, sponge iron powder, sprayed iron powder, ground iron powder, electrolytic iron powder, and crushed iron.

Examples of non-ferrous oxygen absorbers include copolymers containing ethylenic unsaturated groups. Examples of copolymers containing ethylenic unsaturated groups include those polydienes, such as polybutadiene, polychloroprene, poly(2-ethyl butadiene), and poly(2-butyl butadiene), which are mainly polymerized at the 1,4-positions; ring-opening metathesis polymers of cycloolefins such as polyoctenylene, polypentenylene, and polynorbornene; and styrene-diene block copolymers such as styrene-isoprene copolymer, styrene-butadiene copolymer, and styrene-isoprene-styrene block copolymer. Among others, polybutadiene, polyoctenylene, and styrene-isoprene-styrene block copolymer are preferable.

The content of an oxygen absorber in the gas barrier layer is preferably 0.1% to 15% by mass, more preferably 0.5% to 10% by mass, and still more preferably 1% to 7.5% by mass. An oxygen absorber contained within the aforementioned numerical ranges can improve gas barrier properties of the gas barrier layer while maintaining the transparency thereof.

In the case where the preform 10a has a multi-layer structure, examples of specific layer structures include, in the order from innermost to outermost layers: a structure formed of polyester resin layer/gas barrier layer/polyester resin layer; and a structure formed of polyester resin layer/gas barrier layer/polyester resin layer/gas barrier layer/polyester resin layer.

Examples of other specific layer structures include: a structure formed of PET containing layer/MXD-6 containing layer/PET containing layer; a structure formed of PET containing layer/MXD-6 and pro-oxidant containing layer/PET containing layer; a structure formed of PEN containing layer/MXD-6 containing layer/PEN containing layer; and a structure formed of PEN containing layer/MXD-6 and pro-oxidant containing layer/PEN containing layer.

The preform 10a can be produced by injection-molding a resin material or the like using a conventionally known apparatus.

In one embodiment, the container body 10 may be produced by first forming a foamed preform having foamed cells in a diameter of 0.5 to 100 μm by mixing an inert gas (nitrogen gas or argon gas) with a melted thermoplastic resin and then performing the blow molding on the foamed preform. Such a container body 10 contains foamed cells, and thus can enhance light-blocking properties of the entire container body 10.

Heat-Contractive Plastic Member 40a

As illustrated in FIG. 1, the heat-contractive plastic member 40a is not adhered but disposed to surround the outside of the preform 10a, being closely attached so as not to easily move or turn with respect to the preform 10a, or being closely attached to the extent the heat-contractive plastic member 40a does not fall under its own weight.

Since the plastic member 40a has heat contractive properties, the plastic member 40a is prevented from being displaced relative to the preform 10a and from creating air bubbles between the container body 10 and the plastic member 40 during blow molding, thereby providing the composite container 10A having good appearance.

The heat-contractive plastic member 40a is disposed over the entire region of the preform 10a in its circumferential direction so as to surround the preform 10a.

As indicated by the shaded area in FIG. 1, it is preferable that one end of the heat-contractive plastic member 40a closer to the bottom part 30a of the preform 10a is thermo-compression-bonded to form a bottom covering the bottom part 30a of the preform 10a.

Conventionally, it has been difficult to cover the bottom part 30a of the preform 10a with the plastic member 40a that is heat contractive. However, the above-described configuration now makes it possible to cover the bottom of the container body 10 with the heat-contractive plastic member 40 after blow molding, with the result that a variety of functions including gas barrier properties can be given to the bottom of the composite container 10A.

It is particularly preferable that the thermocompression-bonding takes place along the shape of the bottom part 30a of the preform 10a. This achieves preventing air bubbles from being generated between the container body 10 and the heat-contractive plastic member 40 after blow molding, improving adhesion of the heat-contractive plastic member 40 to the container body 10, and improving appearance of the composite container 10A.

Figure 2:
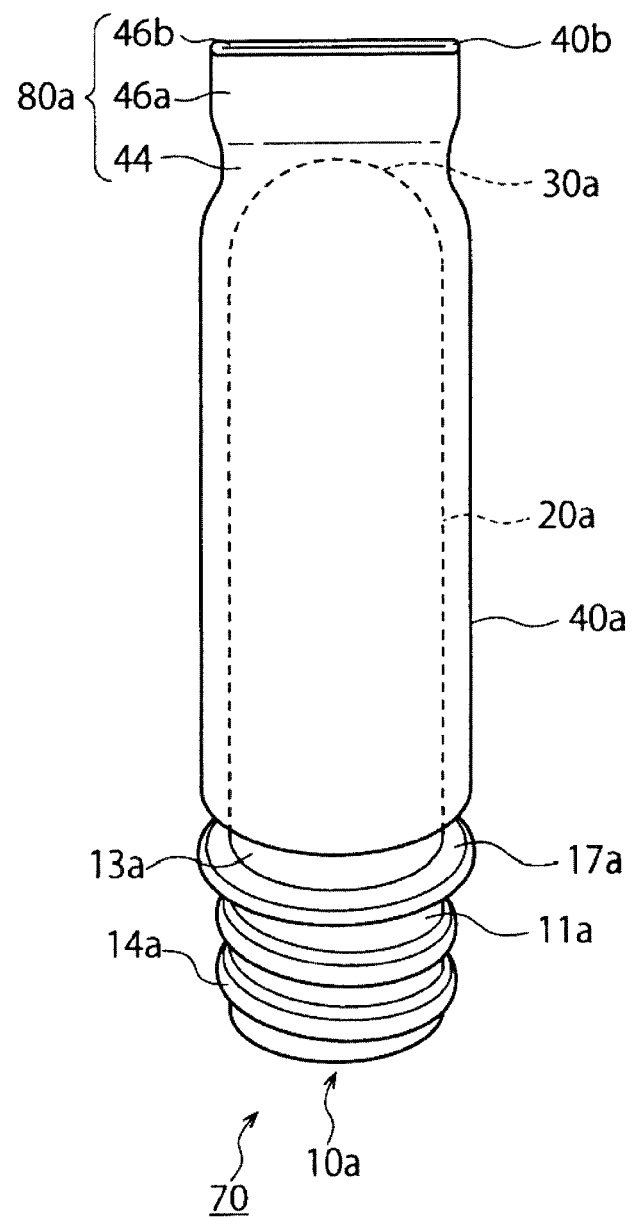
FIG. 2 is a perspective view of the composite preform according to one embodiment of the present invention.

In one embodiment, as illustrated in FIG. 2, the plastic member 40a includes a margin part 80a, and the margin part 80a includes a bent part 44, a first facing surface 46a, and a second facing surface 46b, the bent part 44 being formed along the shape of the preform 10a, and the first facing surface 46a and the second facing surface 46b each projecting from the bent part 44. The first facing surface 46a and the second facing surface 46b are thermocompression-bonded and integrated with each other. When seen from the bottom direction, the first facing surface 46a and the second facing surface 46b each extend in a substantially straight line along a diameter direction of the trunk part 20a of the preform 10a. In this case, the first facing surface 46a and the second facing surface 46b are compression-bonded over the whole diameter direction of the trunk part 20a.

Figure 3:
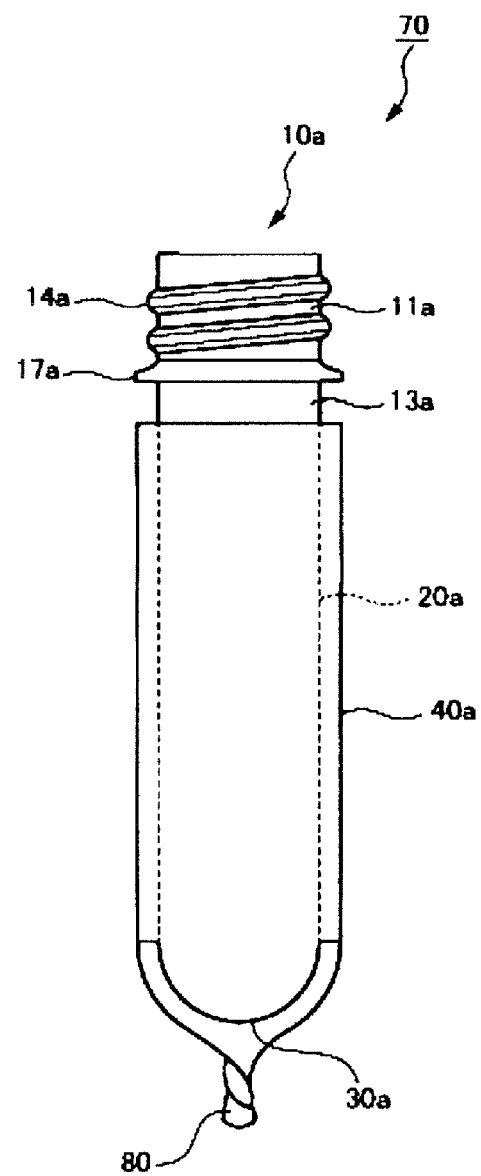
FIG. 3 is a front view of the composite preform with a twisted part formed thereon.

In one embodiment, the heat-contractive plastic member 40a may include a twisted part 80 formed by twisting the thermocompression-bonded portion (see FIG. 3).

The heat-contractive plastic member 40a having the twisted part 80 included therein can form a bottom part and, in addition, prevent air bubbles from being generated between the container body 10 included in the composite container 10A and the heat-contractive plastic member 40 after blow molding and, furthermore, prevent the thermocompression-bonded portion from being removed or otherwise damaged by a force applied during blow molding.

In one embodiment, the heat-contractive plastic member 40a includes at least one cut made in one end of the trunk part 41a, the one end being closer to the mouth part 11a of the preform 10a on which the heat-contractive plastic member 40a is attached.

The heat-contractive plastic member 40a having such cut made therein enables the plastic member 40 to be easily separated and removed from the blow-molded composite container 10A.

The cut is not limited to any specific shape, and may be a slit, or may be a notch in a triangular or rectangular shape, for example.

When a slit is made as the cut, the length of the slit may be determined as appropriate, without specific limitation, in accordance with the shape of the container body 10. For example, a slit having a length of 0.5 mm to 5 mm may be made in the plastic member 40a prior to blow molding.

After the heat-contractive plastic member 40a having a slit in such length is subjected to blow molding along with the preform 10a, the resulting heat-contractive member 40 will have a slit whose length is 3 to 15 mm. With this slit, the heat-contractive plastic member 40 can be easily removed from the container body 10.

The shape of a notch may also be altered as appropriate, without specific limitation, in view of the size, shape, or other factors of the container body 10. For example, the notch may be in any of various shapes including a triangle, a rectangle, or a combination of curves like a semicircle or a fan-like shape.

In the case of a triangular notch, its length may be 0.5 mm to 5 mm and its width may be 0.1 mm to 8 mm; however, dimensions of the notch are not limited thereto.

After the heat-contractive plastic member 40a having a notch in such size is subjected to blow molding along with the preform 10a, the resulting heat-contractive member 40 will have a triangular notch whose length is 1 to 15 mm and whose width is 0.5 to 10 mm. With this notch, the heat-contractive plastic member 40 can be easily removed from the container body 10.

In one embodiment, the heat-contractive plastic member 40a includes a tab connected to the cut. No specific limitation is imposed on the material forming the tab; a resin material used for producing the heat-contractive plastic member 40a or a paper or metal material may be used for the tab.

The heat-contractive plastic member 40a included in the composite preform 70 of the present invention has a near-infrared transmittance of 50% or higher, more preferably 60% to 100%, and still more preferably 70% to 100%.

The heat-contractive plastic member 40a having a near-infrared transmittance falling within the aforementioned numerical ranges can avoid situations in which only the heat-contractive plastic member 40a surrounding the preform 10a is heated and melted during a blow molding process, resulting in a damaged appearance of the heat-contractive plastic member 40a. In addition, the preform 10a can be heated more efficiently, resulting in higher production efficiency.

The near-infrared transmittance of the heat-contractive plastic member 40a can be adjusted by changing, for example, the type or the content of a resin material or a colorant, as described later.

Note that near-infrared herein refers to rays of light having a wavelength of 800 to 2,500 nm.

Also note that a near-infrared transmittance of 50% or higher means a transmittance of 50% or higher for 800 to 2,500 nm as measured by a light absorbance measurement performed on the heat-contractive plastic member 40a using a known spectrophotometer (for example, a spectrometer made by Hamamatsu Photonics K.K.).

The specific gravity of the heat-contractive plastic member 40a is preferably less than 1, and more preferably less than 0.97.

Owing to the heat-contractive plastic member 40a having the aforementioned specific gravity, the heat-contractive plastic member 40 can be easily removed from the container body 10 when the composite container 10A is crushed and then thrown into water.

At the same time, the specific gravity of the container body 10 is preferably greater than 1, and more preferably greater than 1.2.

The heat-contractive plastic member 40a included in the composite preform 70 of the present invention may have a single-layer structure or a multi-layer structure.

The heat-contractive plastic member 40a includes at least a colored layer containing a resin material and a colorant. Owing to the colorant contained in the heat-contractive plastic member 40a, the infrared transmittance of the heat-contractive plastic member 40a can be adjusted. In addition, the visible light transmittance of the blow-molded composite container 10A can also be adjusted.

The heat-contractive plastic member 40a may include two or more colored layers. The individual colored layers may be the same or different in terms of type and content of a material contained therein and thickness of a colored layer.

In one embodiment, the resin material contained in the colored layer is a polyolefin-based resin.

Examples of the polyolefin-based resin include polyethylene (LDPE, MDPE, HDPE, LLDPE), polypropylene, polybutene, polybutadiene, and polyisoprene, as well as copolymers of monomers (alkenes) thereof and other monomers including, for example, copolymer of ethylene and α-olefin having 4 or more carbons, ethylene-(meth)acrylate copolymer, ethylene-methyl (meth)acrylate copolymer, ethylene-ethyl (meth)acrylate copolymer, ethylene-vinyl acetate copolymer, ethylene-vinyl alcohol copolymer, and ionomer resins.

The heat-contractive plastic member 40a may contain one or two or more of the above-listed polyolefin-based resins.

In one embodiment, the colored layer may contain a resin other than polyolefin-based resins, and examples of such resins include PET, PEN, poly-4-methylpentene-1, polystyrene, AS resin, ABS resin, polyvinyl chloride, polyvinylidene chloride, polyvinyl acetate, polyvinyl alcohol, polyvinyl acetal, polyvinyl butyral, diallyl phthalate resin, fluorine-based resin, polymethyl methacrylate, polyacrylic acid, polymethyl acrylate, polyacrylonitrile, polyacrylamide, polybutadiene, polybutene-1, polyisoprene, polychloroprene, ethylene propylene rubber, butyl rubber, nitrile rubber, acrylic rubber, silicone rubber, fluorine-contained rubber, nylon 6, nylon 6,6, MXD6, aromatic polyamide, polycarbonate, polyethylene terephthalate, polybutylene terephthalate, polyethylene naphtha late, U polymer, liquid crystal polymer, modified polyphenylene ether, polyether ketone, polyether ether ketone, unsaturated polyester, alkyd resin, polyimide, polysulfone, polyphenylene sulfide, polyethersulfone, silicone resin, polyurethane, phenolic resin, urea resin, polyethylene oxide, polypropylene oxide, polyacetal, epoxy resin, and ionomer resin.

The content of a resin material in a colored layer is preferably 70% to 95% by mass, and more preferably 80% to 90% by mass.

The colorant contained in the colored layer may be a pigment or dye, but is preferably a pigment in view of light resistance.

The colorant is not limited to a specific color, and thus a colorant of brown, black, green, white, blue, red, or the like may be used. Colorants of a plurality of colors may also be used. For example, a red colorant, a yellow colorant, and a black colorant may be combined into a brown color.

Assuming that the composite container 10A is loaded with beer as the contents, the blow-molded plastic member 40 is needed to cut off a visible light having a wavelength of 400 to 500 nm.

In one embodiment, the heat-contractive plastic member 40a contains a brown colorant, so that a visible light having a wavelength of 400 to 500 nm can be cut off and that the problem of decomposing a bitter component in beer caused by sunlight to generate a sun flavor component, 3-methyl-2-butene-1-thiol, can be prevented.

The term "beer" as used in the present invention refers to the beverages defined as beer in the Japanese Liquor Tax Act, that is, "a fermented drink made from malt, hops, and water; and a fermented drink made from malt, hops, water, rice, and other materials stipulated in government regulations (provided that the ratio of the total weight of such other materials stipulated in government regulation to the weight of malt is not greater than 5/10)". In addition, beverages classified as "low-malt beer" in the Japanese Liquor Tax Act, that is, those beverages with the ratio of the weight of malt to the weight of materials except water: (1) 67/100 or higher, (2) 50/100 to less than 67/100, (3) 25/100 to less than 50/100, and (4) less than 25/100; and other beverages called "the third beer", "beer-flavored beverage", and "other miscellaneous" are included in "beer".

The colored layer may contain one or two or more colorants, the content of which is preferably 0.1% to 30% by mass, and more preferably 0.5% to 10% by mass.

The colored layer containing colorant(s) falling within the aforementioned numerical ranges enable the colorant(s) to be well dispersed in the heat-contractive plastic member 40a. In addition, the heat-contractive plastic member 40a can be easily produced because the moldability is maintained.

To the extent that effects of the present invention are not impaired, the colored layer may contain other additives mentioned above.

Prior to blow molding, the thickness of the colored layer is preferably 5 to 1,000 μm, and more preferably 10 to 500 μm. The colored layer having a thickness falling within the aforementioned numerical ranges can improve light-blocking properties while maintaining blow moldability.

The thickness of the colored layer may be uniform; however, the thickness may be varied taking into consideration a portion of the layer to cover the container body 10 after blow molding.

In one embodiment, the heat-contractive plastic member 40a may further include a gas barrier layer. The heat-contractive plastic member 40a may include two or more gas barrier layers. The individual gas barrier layers may be the same or different in terms of type and content of a material contained therein and thickness of the gas barrier layer.

The gas barrier layer contains a resin with gas barrier properties, example of which resin include meta-xylene adipamide (MXD-6), nylon 6, nylon 6,6, nylon 6/nylon 6,6 copolymer, ethylene-vinyl acetate copolymer (EVA), ethylene-vinyl alcohol copolymer (EVOH), polyglycolic acid (PGA), polyvinylidene chloride copolymer (PVDC), polyacrylonitrile, polyvinyl alcohol (PVA), polytetrafluoroethylene (PTFE), and styrene-isobutylene-styrene copolymer. The gas barrier layer may contain two or more of the above-listed resins having gas barrier properties.

The content of a resin having gas barrier properties in the gas barrier layer is preferably 50% by mass or higher, more preferably 90% by mass or higher. As a result, gas barrier properties of the composite container 10A can further be improved.

The gas barrier layer may contain an oxygen absorber. Descriptions of oxygen absorbers have been provided above.

The content of an oxygen absorber in the gas barrier layer is preferably 0.01% to 10% by mass, more preferably 0.05% to 5% by mass, and still more preferably 0.1% to 2% by mass. An oxygen absorber contained within the aforementioned numerical ranges can improve gas barrier properties of the gas barrier layer while maintaining the transparency thereof.

The gas barrier layer may contain a pro-oxidant. The pro-oxidant is not limited to any specific agent as long as the pro-oxidant accelerates a reaction between molecular oxygen and an oxygen absorber that can be autoxidized by molecular oxygen, and examples thereof include radical generators, photooxidative catalysts, and transition metal salts. Transition metal salts are preferred among others because a transition metal salt even in a small amount can exert a satisfactory effect. The gas barrier layer containing a pro-oxidant accelerates oxidation of an oxygen absorber that can be autoxidized by molecular oxygen, thereby improving the oxygen absorbance capacity.

Examples of a metal salt include inorganic salts, organic salts, and complex salts. Examples of inorganic salts include halogenated salts, oxysalts, oxyacid salts, and silicate salts. Examples of organic salts include carboxylate salts, sulfonic acid salts, and phosphonic acid salts. Examples of complex salts include a complex with β-diketone or β-keto acid ester.

The content of a pro-oxidant in the gas barrier layer is preferably 0.001% to 2% by mass, more preferably 0.005% to 1% by mass, and still more preferably 0.01% to 0.5% by mass. A pro-oxidant contained within these numerical ranges can improve gas barrier properties of the gas barrier layer while maintaining the transparency thereof.

The gas barrier layer may contain the aforementioned resin materials and additives to the extent that characteristics of the gas barrier layer are not impaired.

Prior to blow molding, the thickness of the gas barrier layer is preferably 10 to 300 µm, and more preferably 15 to 100 µm. The gas barrier layer having a thickness falling within the aforementioned numerical ranges can further improve gas barrier properties of the composite container 10A.

The thickness of the gas barrier layer may be uniform; however, the thickness may be varied taking into consideration a portion of the layer to cover the container body 10 after blow molding.

In one embodiment, the heat-contractive plastic member 40a may further include an adhesion layer between the colored layer and the gas barrier layer.

Examples of an adhesive included in an adhesion layer include a polyvinyl acetate-based adhesive, a polyacrylic ester-based adhesive, a cyanoacrylate-based adhesive, an ethylene copolymer adhesive, a cellulose-based adhesive, a polyester-based adhesive, a polyamide-based adhesive, a polyimide-based adhesive, an amino resin-based adhesive, a phenolic resin-based adhesive, an epoxy-based adhesive, a polyurethane-based adhesive, a rubber-based adhesive, and a silicone-based adhesive.

The thickness of the adhesion layer prior to blow molding is not specifically limited, but may be in a range of 5 to 150 µm.

In the case where the heat-contractive plastic member 40a has a multi-layer structure, examples of specific layer structures include, in the order from innermost to outermost layers: a structure formed of colored layer/adhesion layer/gas barrier layer/adhesion layer/colored layer; and a structure formed of colored layer/adhesion layer/gas barrier layer/adhesion layer/colored layer/adhesion layer/gas barrier layer/adhesion layer/colored layer.

In one embodiment, the heat-contractive plastic member 40a can be produced by using a method including an extrusion molding step.

Figure 4A:
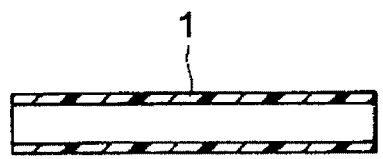
FIGS. 4A-4G are schematic diagrams showing one embodiment of a method for producing a heat-contractive plastic member.

More specifically, first, a resin composition containing any of the above-described resin materials, colorants, and others is heated and melted in an extrusion apparatus, and the melted resin material and others are continuously extruded from a ring die and then cooled, thereby forming an extruded tube 1 that is not stretched (see FIG. 4A).

Next, one end of the unstretched extruded tube is closed by means of welding or adhesion of the one end.

Figure 4B:
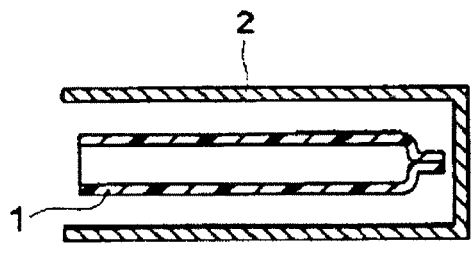

Then, the extruded tube 1 with its one end closed is inserted into a die 2 having a larger inner diameter than the outer diameter of the extruded tube 1 (see FIG. 4B).

Figure 4C:
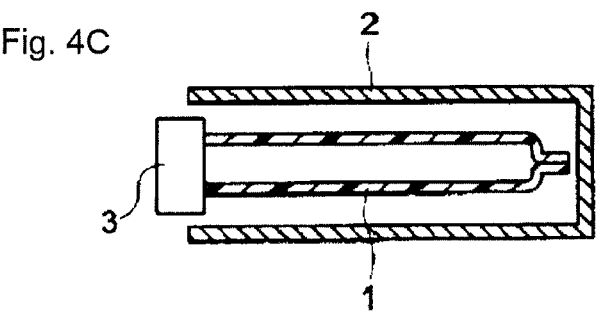

Next, a blowing apparatus 3 is placed (attached) on the other end of the extruded tube 1 (see FIG. 4C). In this step, it is preferable to bring the blowing apparatus 3 in close contact with the extruded tube 1 so that no air is allowed to leak from the extruded tube 1 and from a gap between them.

Figure 4D:
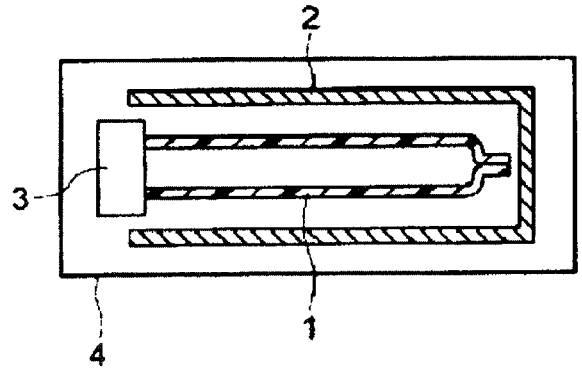

Next, the extruded tube 1, the die 2, and the blowing apparatus 3 are put in this arrangement into a heating furnace 4, and then heated to 70 to 150° C. in the heating furnace 4 (see FIG. 4D). To keep a uniform temperature inside, a hot-air circulating furnace may be used as the heating furnace 4. Alternatively, the extruded tube 1, the die 2, and the blowing apparatus 3 may be heated by passing them through a heated liquid.

Figure 4E:
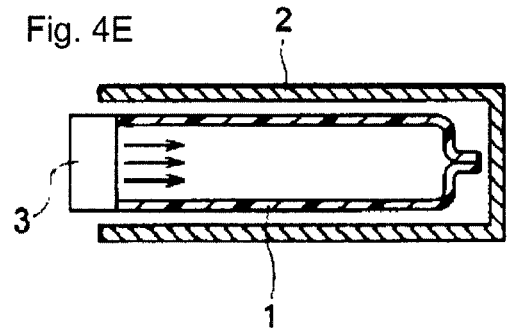

Next, the extruded tube 1, the die 2, and the blowing apparatus 3 are removed from the heating furnace 4, and then the inner surface of the extruded tube 1 is pressurized and expanded by blowing air from the blowing apparatus 3 into the extruded tube 1. As a result, the extruded tube 1 expands while its diameter extends to match the inner shape of the die 2 (see FIG. 4E).

Figure 4F:
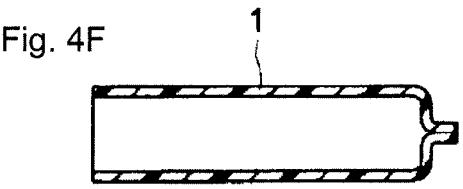
Figure 4G:
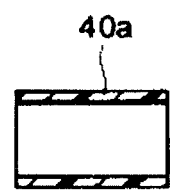

After that, while the blowing apparatus 3 keeps blowing air, the extruded tube 1 is cooled in cold water, and then removed from the die 2 (see FIG. 4F). The extruded tube is cut into a desired size, thereby producing the heat-contractive plastic member 40a (see FIG. 4G).

The heat-contractive plastic member 40a having a multi-layer structure can be produced by coextruding the aforementioned resin composition along with a resin composition containing a resin with gas barrier properties and other contents.

In addition, a print of, for example, images and/or letters may be made on the heat-contractive plastic member 40a. This enables images and/or letters to be displayed on the composite container 10A without the need for attaching a separate label to the container body 10 after blow molding.

Method for Producing Composite Preform 70

A method for producing a composite preform 70 according to the present invention includes the steps of:
preparing the preform 10a and the heat-contractive plastic member 40a;
fitting the preform 10a into the heat-contractive plastic member 40a from the other end of the heat-contractive plastic member 40a; and
heating the preform 10a and the heat-contractive plastic member 40a to cause the heat-contractive plastic member 40a to heat-contract.

The method for producing the composite preform 70 according to the present invention may further include the step of thermocompression-bonding a margin part of the heat-contractive plastic member 40a.

The method for producing the composite preform 70 according to the present invention may further include the step of twisting the thermocompression-bonded margin part to form a twisted part 80.

The method for producing the composite preform 70 according to the present invention may further include the step of making a cut in the heat-contractive plastic member 40a.

The method for producing the composite preform 70 according to the present invention may further include the step of sterilizing the preform 10a and/or the heat-contractive plastic member 40a.

The method for producing the composite preform 70 according to the present invention may further include the step of making a print of, for example, images and/or letters, on the heat-contractive plastic member 40a.

Step of Preparing Preform 10a and Heat-Contractive Plastic Member 40a

As the preform 10a and the heat-contractive plastic member 40a, those produced by using the above-described method or commercially available ones may be used.

Figure 5:
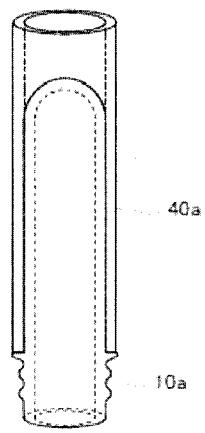
FIG. 5 is a vertical cross-sectional view showing a state in which the preform is fitted into the heat-contractive plastic member.

As shown in FIG. 5, the length X of the heat-contractive plastic member 40a is preferably greater than the sum Y of the lengths of the trunk part 20a and the bottom part 30a of the preform 10a, so that the heat-contractive plastic member 40a has an extra margin part. As a result, one end of the plastic member 40a (40) can be thermocompression-bonded before and/or after blow molding.

The length of the margin part is preferably 3 mm or more, and more preferably 5 to 20 mm.

The margin part having a length falling within the aforementioned numerical ranges enables one end of the plastic member 40a (40) to be easily thermocompression-bonded. Furthermore, provision of an excessive margin part can be avoided to reduce the quantity of materials to be used, resulting in cost reduction.

Figure 6:
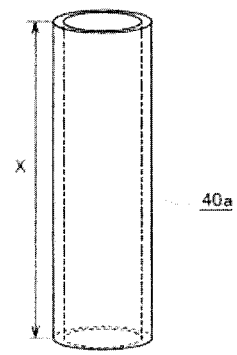
FIG. 6 is a front view of the heat-contractive plastic member.

The length of the heat-contractive plastic member 40a herein refers to the length X prior to heat contraction, as indicated in FIG. 6. The sum of the lengths of the trunk part 20a and the bottom part 30a of the preform 10a refers to the length Y indicated in FIG. 7.

Fitting Step

The method for producing the composite preform 70 according to the present invention includes the step of fitting the preform 10a into the heat-contractive plastic member 40a from one end of the heat-contractive plastic member 40a.

In a preferred embodiment, the preform 10a is preferably preheated by using, for example, near-infrared rays or hot air prior to the fitting step.

This can further improve adhesion of the preform 10a to the heat-contractive plastic member 40a.

No specific limitation is imposed on the pre-heating temperature on the preform 10a; however, the preform 10a is preferably heated to 40 to 90° C., and more preferably 50 to 70° C. Heating the preform 10a to a temperature falling within the aforementioned numerical ranges can further improve the adhesion of the preform 10a to the heat-contractive plastic member 40a.

Heat-Contraction Step

The method for producing the composite preform 70 according to the present invention includes the step of heating both the preform 10a and the heat-contractive plastic member 40a to cause the heat-contractive plastic member 40a to heat-contract and to be in close contact with the preform 10a.

No specific limitation is imposed on the method for heating the preform 10a and the heat-contractive plastic member 40a; for example, near-infrared rays or hot air may be used as appropriate for the heating. The heating temperature is preferably 60 to 250° C., and more preferably 80 to 150° C. Note that the heating temperature refers to a temperature of a surface of the heat-contractive plastic member 40a being heated, not an irradiation temperature of, for example, near-infrared rays or hot air.

Thermocompression-Bonding Step

The method for producing the composite preform 70 according to the present invention may include the step of thermocompression-bonding an end (the other end) opposite to the one end of the heat-contractive plastic member 40a from which the preform 10a has been fitted.

No specific limitation is imposed on the tool used for thermocompression-bonding the heat-contractive plastic member 40a (hereinafter called a "compression-bonding tool" as appropriate) as long as the compression-bonding tool is capable of compression-bonding the end portion by, for example, clamping the end portion after heating the region to be compression-bonded with near-infrared rays or hot air. For example, a tool made of a metal, a tool made of a heat-resistant resin, or a combination thereof may be used.

Figure 8:
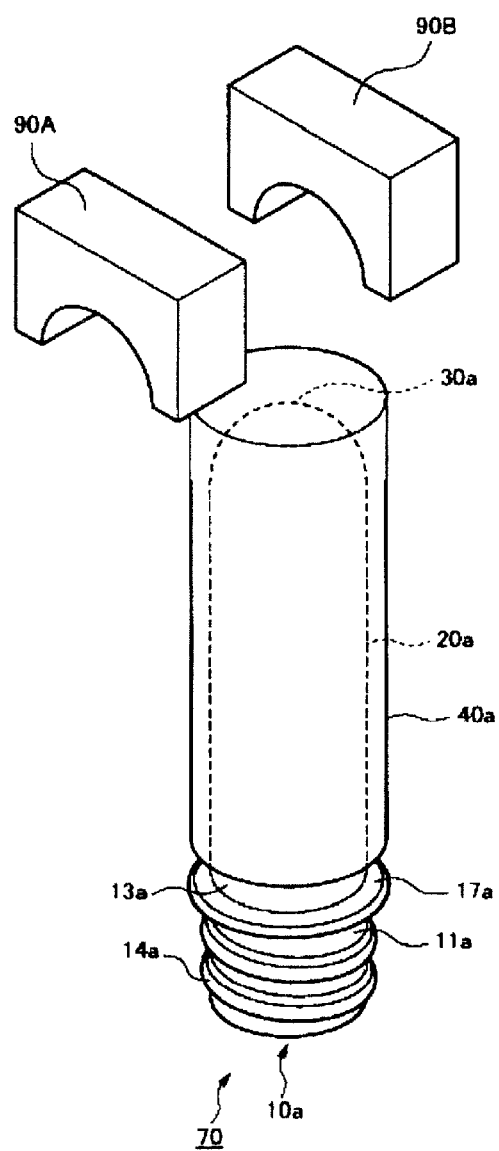
FIG. 8 is a perspective of a compression-bonding tool according to one embodiment.

In the case of thermocompression-bonding the heat-contractive plastic member 40a along the shape of the bottom part 30a of the preform 10a, a pair of compression-bonding tools 90A and 90B in a shape as illustrated in FIG. 8 can be used to clamp the end portion. No specific limitation is imposed on the material for the compression-bonding tool, and a metal or heat-resistant resin material can be used.

Surfaces of the compression-bonding tool may be flat, or may be uneven in part or in whole.

The compression-bonding tool may include a heating mechanism disposed on its surface. The mechanism helps to further improve the compression-bonding strength. The heating temperature on a surface of the compression-bonding tool is preferably 100 to 250° C., for example.

The pressure applied during compression-bonding is preferably 50 to 1,000 N/cm$^2$, and more preferably 100 to 500 N/cm$^2$.

The temperature of the heat-contractive plastic member 40a controlled during compression-bonding is preferably changed as appropriate depending on the configuration of the heat-contractive plastic member 40a, and an example temperature may be 80 to 200° C.

If desired, one end of the heat-contractive plastic member 40a that has been thermocompression-bonded may be cut to a proper length. This improves the appearance of the bottom part of the resulting composite container.

The compression-bonded portion may be cut into a straight line as illustrated in FIG. 1, or into a shape along the shape of the bottom part of the preform 10a (not illustrated).

Step of Forming Twisted Part

The method according to the present invention may include the step of twisting the thermocompression-bonded portion to form the twisted part 80 as illustrated in FIG. 3.

In the case where the method according to the present invention includes the step of forming the twisted part in addition to the thermocompression-bonding step, a bottom is formed in the blow-molded heat-contractive plastic member 40 and, moreover, air bubbles are prevented from being generated between the container body 10 included in the composite container 10A and the heat-contractive plastic member 40. Furthermore, the thermocompression-bonded portion in the heat-contractive plastic member 40a can be prevented from being removed or damaged during blow molding.

No specific limitation is imposed on the method for forming the twisted part 80; for example, the compression-bonded portion may be twisted manually by using a tool like pliers.

Alternatively, the twisted part can be formed mechanically by using, for example, a turning apparatus that includes a turning part and a holding part to hold the preform 10a and the heat-contractive plastic member 40a.

These methods may also be combined as appropriate. Specifically, the twisted part 80 can be formed by, for example, using a tool like pliers to hold the thermocompression-bonded portion and using the turning part to turn the preform 10a and the heat-contractive plastic member 40a.

In one embodiment, the twisted part 80 can be formed simultaneously with the thermocompression-bonding. This results in fewer operation steps and higher productivity.

Specifically, the operation is achieved by providing the compression-bonding tool with a turning mechanism, fixing the preform 10*a* and the heat-contractive plastic member 40*a* to the holding part, and turning the compression-bonding tool. Alternatively, the operation is achieved by using the compression-bonding tool as the holding part while using the turning part to turn the preform 10*a* and the heat-contractive plastic member 40*a*.

No specific limitation is imposed on the extent of twisting the margin part. For example, the margin part may be turned about 0.25 to 30 times or may be continuously turned until the margin part is twisted off; however, to make the appearance better and to effectively prevent the thermocompression-bonded portion from being damaged during blow molding, the margin part is preferably turned until twisted off.

Step of Making a Cut

The method according to the present invention may include the step of making a cut in the heat-contractive plastic member 40*a*.

A cut made in the heat-contractive plastic member 40*a* enables the heat-contractive plastic member 40 to be easily separated and removed from the blow-molded composite container 10A.

No specific limitation is imposed on the position where a cut is made; however, in view of ease of separation, a cut is preferably made on one end of the trunk part 41*a* of the heat-contractive plastic member 40*a*, the one end being closer to the mouth part 11*a* of the preform 10*a* on which the heat-contractive plastic member 40*a* is attached. No limitation is imposed on the number of cuts, and thus two or more cuts may be made.

No specific limitation is imposed on the method for making a cut; for example, a cut can be made in the heat-contractive plastic member 40*a* that is not fitted to the preform 10*a* yet by using scissors or a knife. Even after the preform 10*a* is fitted into the plastic member, a cut can be made by using laser light, for example.

No specific limitation is imposed on the type of laser light, examples of which include He—Ne laser, Ar laser, carbon dioxide laser, excimer laser, metal-vapor laser, fiber laser, YAG lasers including Nd:YAG laser, and harmonic lasers thereof.

A cut may also be made in the heat-contractive plastic member 40 by using, for example, laser light after the composite preform 70 is blow-molded into the composite container 10A.

The method according to the present invention may include the step of disposing a tab connected to the cut for the purpose of further facilitating separation of the heat-contractive plastic member 40.

The tab can be attached to the heat-contractive plastic member 40*a* with a conventionally known adhesive. Examples of the adhesive that can be used include a polyvinyl acetate-based adhesive, a polyacrylic ester-based adhesive, a cyanoacrylate-based adhesive, an ethylene copolymer adhesive, a cellulose-based adhesive, a polyester-based adhesive, a polyamide-based adhesive, a polyimide-based adhesive, an amino resin-based adhesive, a phenolic resin-based adhesive, an epoxy-based adhesive, a polyurethane-based adhesive, a rubber-based adhesive, and a silicone-based adhesive.

The tab may be attached to the heat-contractive plastic member 40*a* that has not been blow-molded yet or to the heat-contractive plastic member 40 that has been blow-molded.

Sterilizing Step

The method according to the present invention may include the step of sterilizing inner and outer surfaces of the preform 10*a* and/or inner and outer surfaces of the heat-contractive plastic member 40*a*.

The sterilization step may be carried out on either or both of the preform 10*a* and the heat-contractive plastic member 40*a* that have not been fitted yet and the preform 10*a* and the heat-contractive plastic member 40*a* that have been fitted.

The sterilization step may further be carried out on the container body 10 and the heat-contractive plastic member 40 that are incorporated in the blow-molded composite container 10A.

Examples of a sterilization method include an agent sterilization process, a light sterilization process, a radio sterilization process, a hot water sterilization process, a hot filling sterilization process, and a pasteurizing sterilization process. Any combination thereof may also be used.

The following describes these sterilization processes.

<Agent Sterilization Process>

(1) One example of the agent sterilization is hydrogen peroxide ($H_2O_2$) sterilization. In a hydrogen peroxide sterilization process, sterilization is performed by generating a mist or gas or a mixture thereof containing a hydrogen peroxide component, and injecting the mist or gas or the mixture thereof containing hydrogen peroxide onto the preform 10*a*, the heat-contractive plastic member 40*a*, the composite preform 70, or the composite container 10A. Alternatively, the preform 10*a*, the heat-contractive plastic member 40*a*, and the composite preform 70 may be sterilized by immersing these components in hydrogen peroxide water and then blowing hot air thereto.

When brought in contact with or adhering to the preform 10*a*, hydrogen peroxide sterilizes or damages microorganisms on a surface thereof.

Spraying hot air onto the preform 10*a* immediately before and/or after injecting a mist or gas or a mixture thereof on the preform 10*a* can activate hydrogen peroxide adhering to the preform 10*a*, thereby making the sterilization process effective. The hot air process also exerts an effect of removing excess hydrogen peroxide.

(2) Another example of the agent sterilization is peracetic acid ($CH_3COOH$) sterilization. In a peracetic acid sterilization process, sterilization is performed by spraying aqueous peracetic acid in the form of a liquid or gas to the preform 10*a*, the heat-contractive plastic member 40*a*, the composite preform 70, or the composite container 10A.

(3) Another example of the agent sterilization is chlorine sterilization. In a chlorine sterilization process, sterilization is performed by cleaning the preform 10*a*, the heat-contractive plastic member 40*a*, the composite preform 70, or the composite container 10A with an acidic cleaner such as an aqueous chlorite solution.

(4) As another example of the agent sterilization, alkaline aqueous solution sterilization based on an alkaline aqueous solution can be used. In an alkaline aqueous solution sterilization process, sterilization is performed by cleaning the preform 10*a*, the heat-contractive plastic member 40*a*, the composite preform 70, or the composite container 10A with an alkaline aqueous solution containing, for example, aqueous sodium hydroxide, aqueous potassium hydroxide, or aqueous sodium carbonate.

(5) As another example of the agent sterilization, ozone sterilization based on ozone (03) can be used. In an ozone sterilization process, sterilization is performed by injecting ozone to the preform 10a, the heat-contractive plastic member 40a, the composite preform 70, or the composite container 10A.

<Light Sterilization Process>

(1) Examples of the light sterilization include UV sterilization and pulsed light sterilization. In such sterilization processes, sterilization is performed by irradiating the preform 10a, the heat-contractive plastic member 40a, the composite preform 70, or the composite container 10A with light. As an example of the light, ultraviolet rays having a wavelength of 150 to 2,000 nm or light emitted by a xenon lamp can be used.

(2) Another example of the light sterilization is plasma sterilization. In a plasma sterilization process, sterilization is performed by generating a low-temperature plasma in a decompression chamber and irradiating the preform 10a, the heat-contractive plastic member 40a, the composite preform 70, or the composite container 10A with the plasma.

<Radio Sterilization Process>

As an example of the radio sterilization, an EB sterilization process can be used. In an EB sterilization process, sterilization is performed by irradiating the preform 10a, the heat-contractive plastic member 40a, the composite preform 70, or the composite container 10A with electron beams (EB).

<Hot Water Sterilization Process>

(1) In a hot water sterilization process, sterilization is performed by preparing hot water at, for example, 70 to 95° C. and injecting the hot water to the preform 10a, the heat-contractive plastic member 40a, the composite preform 70, or the composite container 10A.

<Hot Filling Sterilization Process>

(1) In a hot filling sterilization process, the composite container 10A is sterilized by preparing a mid-temperature content fluid at, for example, 60 to 80° C. and filling the composite container 10A with the mid-temperature content fluid. During the hot filling sterilization process, the sterilization process can be carried out simultaneously with filling the composite container 10A with a content fluid.

(2) Alternatively, the hot filling sterilization process can be carried out on the composite container 10A by preparing a high-temperature content fluid at, for example, 80 to 95° C., filling the composite container 10A with the high-temperature content fluid, and overturning the composite container 10A.

(3) Sterilization can also be performed by moistening the preform 10a, the heat-contractive plastic member 40a, and the composite preform 70 with water vapor and heating the preform.

<Pasteurizing Sterilization Process>

(1) Other sterilization processes include a pasteurizing sterilization process in which sterilization is performed by filling the composite container 10A with a content fluid and then performing a sterilization process on the composite container 10A filled with the content fluid.

Printing Step

A print can be made on the heat-contractive plastic member 40a by printing processes including, for example, the inkjet process, the screen printing process, the rotogravure printing process, the offset printing process, the flexography process, the thermal transfer process, and the hot stamping (foil stamping).

For example, in the case of using the inkjet process, images and/or letters can be printed on the heat-contractive plastic member 40a by applying a UV curable ink onto the heat-contractive plastic member 40a and irradiating the plastic member with UV light to cure the ink.

The print may be made on the heat-contractive plastic member 40a that is not fitted to the preform 10a yet, or may be made on the heat-contractive plastic member 40a that has been disposed on the outside of the preform 10a. The print may also be made on the heat-contractive plastic member 40 included in the blow-molded composite container 10A.

Composite Container 10A

Figure 9:
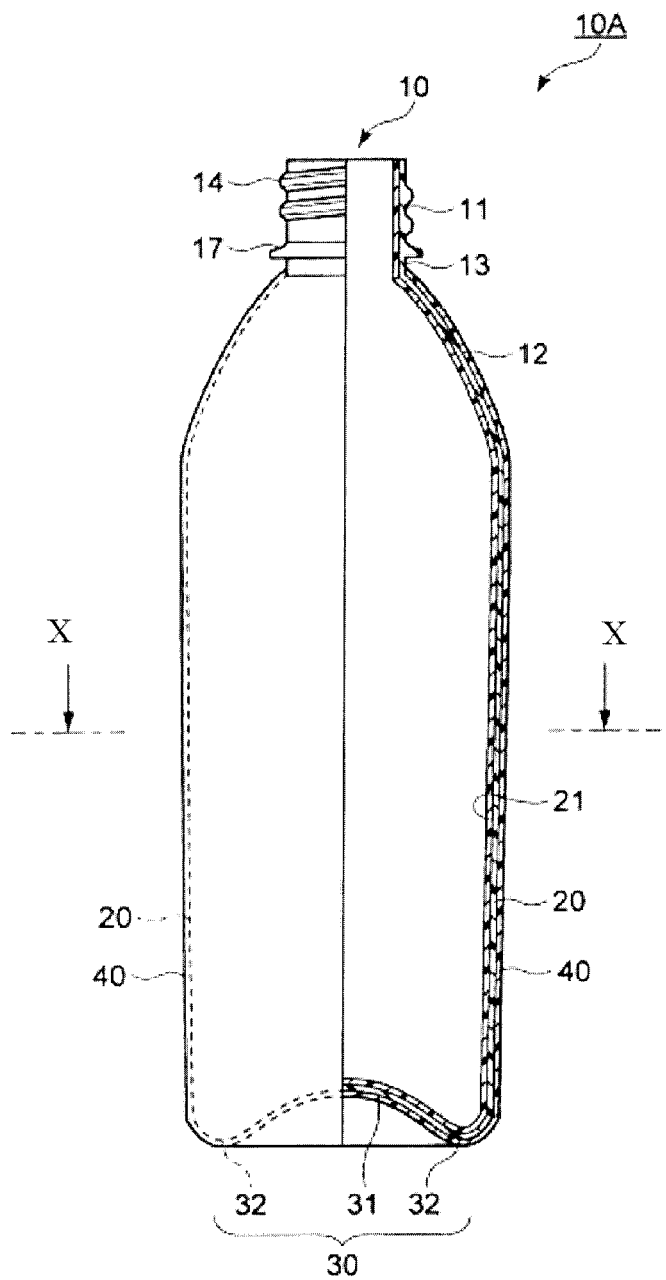
FIG. 9 is a partial vertical cross-sectional view illustrating a composite container produced by using the composite preform according to one embodiment of the present invention.

The composite container 10A according to the present invention is a blow-molded article of the above-described composite preform 70 and includes, as illustrated in FIG. 9, the container body 10, which is located inside, and the heat-contractive plastic member 40, which is disposed in close contact with the outside of the container body 10. In one embodiment, the composite container 10A of the present invention includes a vapor-deposited film 21 formed on an inner surface of the container body 10.

The heat-contractive plastic member 40 is not welded or adhered to the container body 10, and thus the heat-contractive plastic member 40 can be separated (peeled off) from the container body 10 and collected.

The heat-contractive plastic member 40 can be separated (peeled off) from the container body 10 by, for example, cutting out the heat-contractive plastic member 40 with a tool such as a cutter, or by peeling off the heat-contractive plastic member 40 along a cutting line or the above-described cut which is made in advance in the heat-contractive plastic member 40.

In another aspect, the heat-contractive plastic member 40 can be separated and collected by crushing the composite container 10A, which is then immersed in hot water, and then retrieving the heat-contractive plastic member 40 utilizing the difference in specific gravity between the heat-contractive plastic member 40 and the container body 10. The heat-contractive plastic member 40 can also be easily peeled off from the container body 10 that is immersed in hot water, because of the heat-contractive properties of the heat-contractive plastic member 40.

By using the methods described above, the heat-contractive plastic member 40 can be separated and removed from the container body 10, which means the clear and colorless container body 10 can by recycled in a conventional manner.

The oxygen transmission rate of the composite container 10A is preferably 0.5 cc/m$^2$·day·0.21 atm or less, and more preferably 0.3 cc/m$^2$·day·0.21 atm or less.

In the present invention, the oxygen transmission rate refers to a measurement value provided by measurement on an oxygen transmission rate tester (for example, a tester named OX-TRAN 2/20 made by MOCON) under conditions of 23° C. and 90% RH humidity in compliance with JIS K 7126 equal-pressure method, the measurement value being obtained by taking a measurement of the whole composite container 10A with the mouth part closed by a jig, and dividing the measurement by the surface area of the whole container except the mouth part.

Container Body 10

The container body 10 includes a mouth part 11, a neck part 13 disposed below the mouth part 11, a shoulder part 12 disposed below the neck part 13, a trunk part 20 disposed below the shoulder part 12, and a bottom part 30 disposed below the trunk part 20. The terms "above" and "below", as used herein, refer to an upper part and a lower part, respectively, of an upright composite container 10A (FIG. 9).

The mouth part 11 includes a screw part 14, onto which a cap (not illustrated) will be attached, and a flange part 17, which is disposed below the screw part 14. The mouth part 11 may be in a conventionally known shape; for example, the mouth part 11 may be a stopper type mouth or in a shape to which a bottle cap can be applied.

The neck part 13, located between the flange part 17 and the shoulder part 12, has a substantially cylindrical shape that is substantially uniform in diameter. The shoulder part 12, located between the neck part 13 and the trunk part 20, is in a shape whose diameter gradually increases from the side of the neck part 13 toward the side of the trunk part 20.

In one embodiment, the trunk part 20 has a cylindrical shape that is substantially uniform in diameter as a whole. However, the trunk part 20 is not limited thereto but may be in a polygonal cylindrical shape such as a square cylindrical or octagonal cylindrical shape. In one embodiment, the trunk part 20 is in a cylindrical shape whose horizontal cross-sections are not uniform from top to bottom.

The trunk part 20 may include irregularities such as panels or grooves formed thereon.

When the contents are a carbonated drink such as beer or carbonated water, the trunk part 20 preferably has no such irregularities. This can prevent deformation of the container body 10 caused by rise in internal pressure.

The bottom part 30 includes a concave part 31 located at a center, and a grounding part 32 disposed around the concave part 31. Note that the bottom part 30 is not limited to a specific shape but may be in a conventionally known bottom shape (e.g., a petaloid or round bottom shape). When the composite container 10A is loaded with a carbonated drink such as beer or carbonated water as the contents, the bottom part 30 is preferably in a petaloid shape.

The container body 10 included in the composite container 10A of the present invention may have a single-layer structure or a multi-layer structure.

In one embodiment, the container body includes a gas barrier layer. Types, content, and other information about a resin material contained in the gas barrier layer have been described above.

The thickness in average of the container body 10 except the mouth part 11 is preferably 200 to 1,000 µm, and more preferably 250 to 750 µm. This can effectively prevent deformation of the container body 10 that contains beer, carbonated water, or the like and is kept in storage.

Plastic Member 40

Figure 10:
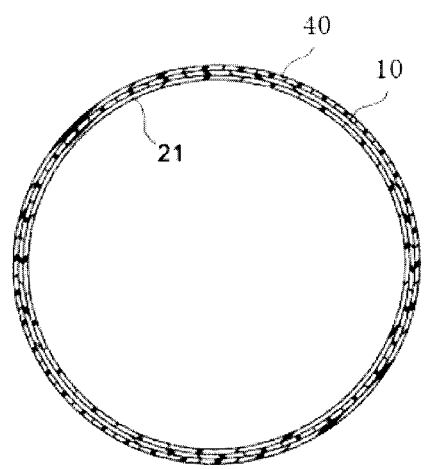
FIG. 10 is a horizontal cross-sectional view of the composite container taken along the line x-x in FIG. 9.

The heat-contractive plastic member 40 is thinly stretched and brought in close contact with the outer surface of the container body 10 so as not to easily move or turn with respect to the container body 10. As illustrated in FIG. 10, the heat-contractive plastic member 40 is disposed over the entire region of the container body 10 in its circumferential direction so as to surround the container body 10, having a substantially circular horizontal cross section.

One end of the plastic member 40 on the bottom part 30 side of the container body 10 is compression-bonded to form a bottom covering the bottom part 30 of the container body 10.

One end of the heat-contractive plastic member 40 included in the composite container 10A of the present invention is compression-bonded to form a bottom, and the heat-contractive plastic member 40 can be disposed so as to cover the shoulder part 12, the trunk part 20, and the bottom part 30 of the container body 10 excluding the mouth part 11 and the neck part 13. Owing to this configuration, desired functions and characteristics can be given to the shoulder part 12, the trunk part 20, and the bottom part 30 of the container body 10.

As described above, the compression-bonded portion may be twisted.

The heat-contractive plastic member 40 included in the composite container 10A of the present invention includes at least a colored layer.

In one embodiment, the heat-contractive plastic member 40 further includes a gas barrier layer.

Types, content, and other information about a resin material contained in each of the layers in the heat-contractive plastic member 40 have been described above.

The thickness of the heat-contractive plastic member 40 that is attached on the container body 10 is preferably 5 to 200 µm, and more preferably 10 to 100 µm. The thickness of the heat-contractive plastic member 40 may be uniform as a whole or may be varied as appropriate for different sites of the container body 10 covered by the plastic member 40.

The thickness of the colored layer in the composite container 10A is preferably 5 to 100 µm, and more preferably 5 to 50 µm.

The thickness of the gas barrier layer in the composite container 10A is preferably 1 to 100 µm, and more preferably 1 to 20 µm.

The heat-contractive plastic member 40 is obtained by disposing the heat-contractive plastic member 40a so as to surround the outside of the preform 10a as described later, bringing the heat-contractive plastic member 40a in close contact with the outside of the preform 10a, and then performing biaxial stretch blow molding on the heat-contractive plastic member 40a along with the preform 10a.

As described above, in the case where the container is loaded with beer as the contents, the heat-contractive plastic member 40 is needed to have functions to cut off a visible light having a wavelength of 400 to 500 nm.

The composite container 10A that includes the heat-contractive plastic member 40 has a visible light transmittance of preferably 15% or less, more preferably 5% or less, and still more preferably 1% or less, the visible light having a wavelength of 400 to 500 nm.

The visible light transmittance can be adjusted by changing, for example, the type or the content of a colorant contained in the heat-contractive plastic member 40.

Regarding the visible light transmittance, a transmittance of light having visible light wavelengths can be obtained by taking measurements at 0.5 nm intervals using a spectrophotometer (UV-Vis Spectrophotometer made by Shimadzu Corporation).

The heat-contractive plastic member 40 may include a cut made therein. The cut may be a slit, or may be a notch in a triangular or rectangular shape, for example.

For example, when a slit is made in the heat-contractive plastic member 40a prior to blow molding, the slit will have a horizontally stretched shape after the heat-contractive plastic member 40a is stretched during blow molding.

The heat-contractive plastic member 40 may include a tab connected to the cut.

Details of the cut and the tab have been provided above and thus are omitted here.

Vapor-Deposited Film 21

In one embodiment, the composite container 10A of the present invention includes a vapor-deposited film 21 formed on an inner surface of the container body 10.

In this case, the vapor-deposited film 21 has a substantially uniform thickness and is formed on the entire inner surface of the container body 10. The composite container 10A with the vapor-deposited film 21 formed according to the present invention can improve oxygen, carbon dioxide, and water vapor barrier properties of the composite container.

In one embodiment, the vapor-deposited film 21 is preferably made of inorganic oxides from the viewpoint of oxygen, water vapor, and other gas barrier properties and transparency.

Examples of the inorganic oxides that can be used include aluminum oxide, silicon oxide, magnesium oxide, calcium oxide, zirconium oxide, titanium oxide, boron oxide, hafnium oxide, and barium oxide. From the viewpoint of gas barrier properties and production efficiency, silicon oxide is particularly preferable among others.

In one embodiment, carbon-added silicon oxide (SiOC) may be used.

In the case where the vapor-deposited film 21 contains silicon oxide, the silicon oxide is expressed by a general formula $SiO_x$ (where X represents a number ranging from 0 to 2), and X preferably represents a number ranging from 1.3 to 1.9 from the viewpoint of gas barrier properties and transparency.

The vapor-deposited film 21 containing silicon oxide has the silicon oxide as a main component, and may further contain, through chemical bonding or the like, at least one compound including at least one selected from carbon, hydrogen, silicon, and oxygen. For example, the vapor-deposited film 21 may contain, through chemical bonding or the like, a compound including C—H bonds; a compound including Si—H bonds; graphitoid, diamond-like, or fullerene carbon units; and the row material, an organosilicon compound, or a derivative thereof. Specific examples may include a hydrocarbon having a $CH_3$ moiety, hydro silica such as $SiH_3$ silyl or $SiH_2$ silylene, a hydroxy group derivative such as $SiH_2OH$ silanol.

In another embodiment, the vapor-deposited film 21 may be a hard carbon film made of, for example, a diamond-like carbon (DLC) film. The hard carbon film made of a DLC film is a hard carbon film called i-carbon film or amorphous carbon film (a-C:H) and refers to an amorphous carbon film primarily characterized by $SP^3$ bonds.

The thickness of the aforementioned vapor-deposited film 21 is preferably 0.002 to 0.4 μm, and more preferably 0.005 to 0.1 μm.

The vapor-deposited film 21 having a thickness falling within the aforementioned numerical ranges can prevent cracks from occurring in the vapor-deposited film 21 while maintaining the gas barrier properties. Note that the vapor-deposited film 21 in FIGS. 9 and 10 is depicted exaggeratedly in the thickness direction.

The composite container 10A of the present invention may include a label attached on the container body 10 and/or the heat-contractive plastic member 40. The label may be disposed so as to cover the container body 10 in whole or in part.

Examples of the label may include a shrink label, a stretch label, a roll label, a tack label, a paper label, and a label hung with a string from the neck part 13 of the composite container 10A (hereinafter called a "hung label" if appropriate). It is preferable to use a shrink label, a stretch label, or a roll label, among others, because of their high productivity.

A conventionally known shrink label with light-blocking properties or paper label may be used to further improve the light-blocking properties.

A shrink label can be wrapped around to cover the container body 10 and/or the heat-contractive plastic member 40 in part or in whole. The shrink label can be obtained by attaching a shrink label on the container body 10 and/or the heat-contractive plastic member 40 and then performing shrink-wrapping at a temperature of 80 to 90 degrees.

The shrink label can be produced by using a resin film, such as a polylactic acid-based film, a polystyrene-based film, a polyester-based film, a low-density polyethylene film, a medium-density polyethylene film, a high-density polyethylene film, a low-density linear polyethylene film, a cyclic polyolefin film, a polypropylene film, a centrifugal polyolefin film formed of resins such as ethylene-propylene copolymers, ethylene-vinyl acetate copolymers, ionomer resins, ethylene-acrylate copolymers, ethylene-methyl acrylate copolymers, a polyester-polystyrene multi-layer film, a laminated film of non-woven fabric and a shrink film, a polyester-polystyrene coextruded film, a polyamide film such as a 6-nylon or 6,6-nylon film, a modified polyolefin film formed of resins such as chlorinated polyethylene or chlorinated polypropylene, a film formed of resins of vinyl chloride-vinyl acetate copolymers, and an acrylic resin film.

As for the aforementioned films, any of the following various resin films may be used: a single-layer film formed with one or two or more types of component resins using a film-forming process such as the extrusion process, the cast molding process, the T-die process, the cutting process, the inflation process, or the like; a multi-layer film formed by coextruding two or more types of resins; and a film of different resins formed by mixing two or more types of resins and stretching the film uniaxially or biaxially using the tubular method, the tenter method, or the like. A uniaxially stretched film stretched in the flow direction, among others, is preferred. A foamed resin film may also be used as the resin film.

Films that can be suitably used in the present invention include, for example, stretched polyester-based films, stretched polystyrene-based films, stretched polyolefin-based films, polylactic acid-based films, foamed polyolefin-based films, stretched polyester-polystyrene coextruded films, foamed polystyrene-based films, and polyester-polystyrene multi-layer films, because of their excellent thermal insulation. A laminated film formed of non-woven fabric and any of the aforementioned films may also be used.

A stretched film may be uniaxially stretched or biaxially stretched, and a uniaxially stretched film may be stretched in the longitudinal direction or in the transverse direction.

An example of the thickness of the shrink label attached on the composite container 10A may be, without limitation, approximately 10 to 80 μm.

As with the shrink label, a stretch label can be wrapped around to cover the container body 10 and/or the heat-contractive plastic member 40 in part or in whole. The stretch label wrapped around the composite container 10A can be produced by fitting the label onto the composite container 10A while pulling the label in the circumferential direction, and then by removing the pulling force, which allows the label to shrink and follow the composite container 10A.

The stretch label can be produced by using a single-layer or multi-layer resin film composed of a thermoplastic resin film with moderate flexibility, such as, for example, low-density polyethylene, medium-density polyethylene, high-density polyethylene, low-density linear polyethylene, polypropylene, or other polyolefin resins. Among others, a single-layer film composed of low-density linear polyethylene or a multi-layer film having a layer composed of low-density linear polyethylene is preferably used to produce the stretch label. These films can be produced by using the method described above.

An example of the thickness of the stretch label attached on the composite container 10A may be, without limitation, approximately 5 to 50 μm.

As with the shrink label, a roll label and a tack label each can be wrapped around to cover the container body 10 and/or the heat-contractive plastic member 40 in part or in whole. The roll label can be produced by wrapping a resin film around the composite container and sticking or fusing an end of the resin film onto the container.

The tack label can be produced by directly attaching a resin film on the composite container mediated by an adhesive or the like.

Examples of the adhesive include a polyvinyl acetate-based adhesive, a polyacrylic ester-based adhesive, a cyanoacrylate-based adhesive, an ethylene copolymer adhesive, a cellulose-based adhesive, a polyester-based adhesive, a polyamide-based adhesive, a polyimide-based adhesive, an amino resin-based adhesive, a phenolic resin-based adhesive, an epoxy-based adhesive, a polyurethane-based adhesive, a rubber-based adhesive, and a silicone-based adhesive.

An example of the thickness of the roll label or the tack label attached on the composite container 10A may be, without limitation, approximately 5 to 100 μm.

As with the shrink label, a paper label can be wrapped around to cover the container body 10 and/or the heat-contractive plastic member 40 in part or in whole. As with the tack label, the paper label can be produced by directly attaching a resin film on the composite container mediated by an adhesive or the like.

To produce the paper label, it is preferable to use highly water-resistant paper impregnated with, for example, a polyisocyanate compound.

An example of the thickness of the paper label attached on the composite container 10A may be, without limitation, approximately 50 to 300 μm.

A hung label can be produced by hanging a label made of a resin film or paper with, for example, a string, from the neck part 13 of the composite container 10A. The label is not limited to any specific size or thickness, and thus the label in any size and thickness may be used.

A print may be made on the label. A print can be made by printing processes including, for example, the inkjet process, the rotogravure printing process, the offset printing process, the flexography process, the thermal transfer process, the hot stamping (foil stamping), the screen printing process, and the pad printing process. In addition to the artwork and product name, text information indicating names of the liquid contents, the manufacturer, and the raw materials may be displayed. The label may be colored, in part or in whole, in red, blue, yellow, green, brown, black, white, or the like, and may be transparent or opaque.

Method for Producing Composite Container 10A

A method for producing the composite container 10A according to the present invention includes the steps of:

heating the composite preform 70 and inserting the composite preform 70 into a blow molding die; and integrally inflating the preform 10a and the heat-contractive plastic member 40a by performing blow molding on the composite preform 70 that has been heated.

In one embodiment, the method for producing the composite container 10A according to the present invention further includes the step of forming the vapor-deposited film 21 on an inner surface of the container body 10.

The method may further include the step of performing a sterilization process on the composite container 10A, as described above.

A method for blow molding the composite preform 70 according to the present invention will now be described in detail with reference to FIGS. 11A to 11D.

Figure 11A:
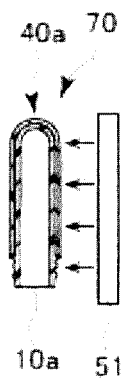
FIGS. 11A-11D are schematic diagrams illustrating a method for producing the composite container.

In one embodiment, the composite preform 70 is heated by a near-infrared irradiation apparatus 51 (see FIG. 11A). The heating method is not limited thereto; for example, hot air, microwaves, or laser may be used for the heating.

In this step, the composite preform 70, while turning with the mouth part 11a facing downward, is heated uniformly by the heating apparatus 51 in the circumferential direction.

The heating temperature for the preform 10a and the plastic member 40a in this heating step can be set to 90 to 130° C., for example.

Subsequently, the composite preform 70, which has been heated by the near-infrared heating apparatus 51, is transferred to a blow molding die 50 (see FIG. 11B).

The blow molding die 50 is used to form the composite container 10A.

Figure 11B:
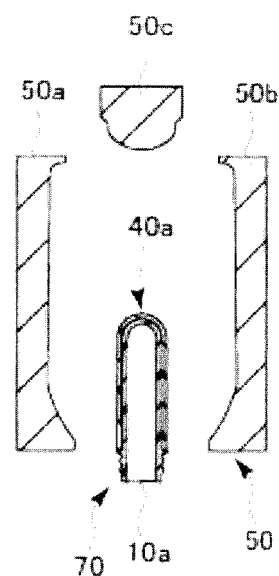

In one embodiment, the blow molding die 50 is composed of a pair of trunk part dies 50a and 50b separated from each other and a bottom part die 50c (see FIG. 11B). With reference to FIG. 11B, the pair of trunk part dies 50a and 50b are away from each other, while the bottom part die 50c is lifted upward. The composite preform 70 is inserted between the pair of trunk part dies 50a and 50b.

Figure 11C:
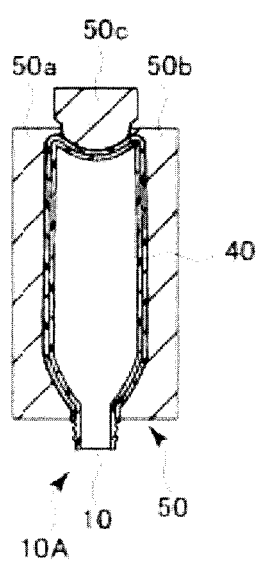

Next, as illustrated in FIG. 11C, the bottom part die 50c descends and the pair of trunk part dies 50a and 50b are closed, forming the blow molding die 50 sealed with the pair of trunk part dies 50a and 50b and the bottom part die 50c. Next, a rod for vertical stretch enters the preform from the mouth part and comes into contact with the bottom part on an inner surface to keep stretching the preform, and then air is injected into the preform 10a, followed by biaxial stretch blow molding performed on the composite preform 70.

Meanwhile, the trunk part dies 50a and 50b are heated up to 30 to 80° C. and the bottom part die 50c is cooled down to 5 to 25° C. In this step, the preform 10a and the heat-contractive plastic member 40a of the composite preform 70 are integrally inflated in the blow molding die 50. Consequently, the preform 10a and the heat-contractive plastic member 40a are integrally formed into a shape corresponding to the inner surface of the blow molding die 50.

Figure 11D:
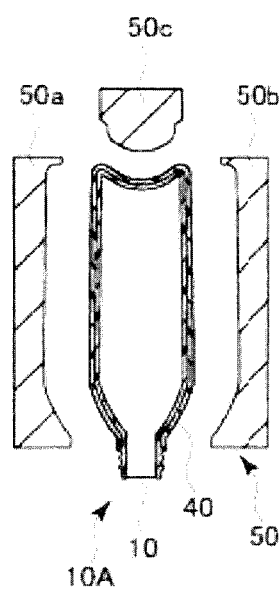

Then, as illustrated in FIG. 11D, the pair of trunk part dies 50a and 50b and the bottom part die 50c are separated from one another, and the composite container 10A on which no vapor-deposited film is formed yet is removed from the blow molding die 50.

The above method is not restrictive, and the composite container 10A may alternatively produced through two-step blow molding.

Specifically, the composite preform 70 is first blow molded to be larger than the composite container 10A to be produced having a desired capacity, and then the composite container 10A is heated and allowed to freely contract. Then, the contracted composite container 10A is blow molded into the composite container 10A having the desired capacity. Blow molding the composite container 10A in such a manner can produce the composite container 10A having higher strength and improved heat resistance.

Figure 12:
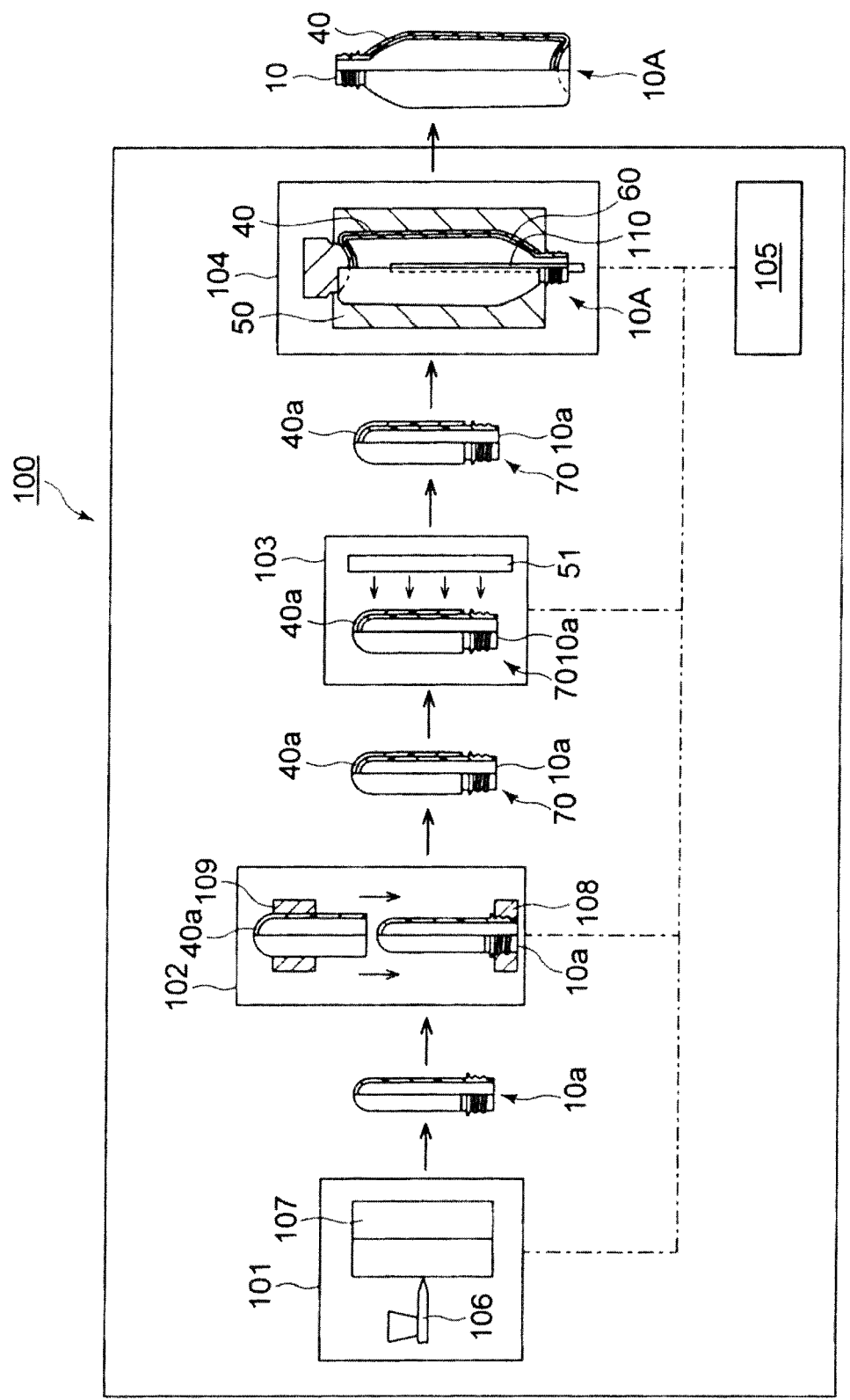
FIG. 12 is a schematic diagram illustrating an apparatus for producing the composite container according to one embodiment.

Referring to FIG. 12, the following describes an apparatus used for the blow molding according to one embodiment.

A production apparatus 100 illustrated in FIG. 12 is for producing the above-described composite container 10A. The production apparatus 100 for the composite container 10A includes a molding unit 101, a plastic member attaching unit 102, a heating unit 103, and a blow molding unit 104.

The molding unit 101, the plastic member attaching unit 102, the heating unit 103, and the blow molding unit 104 are integrated with one another in the production apparatus 100.

The apparatus enables the composite preform 70 and the composite container 10A to be produced within a single apparatus.

The production apparatus 100 for the composite container further includes a controller 105 that controls the molding unit 101, the plastic member attaching unit 102, the heating unit 103, and the blow molding unit 104. The term "integrated" as used herein means that a plurality of elements are physically connected to be integrated or that a plurality of elements are integrally controlled by a single controller (e.g., the controller 105).

In the production apparatus 100, the molding unit 101, the plastic member attaching unit 102, the heating unit 103, and the blow molding unit 104 are placed from upstream to downstream in the order mentioned. These units are arranged in a straight line in FIG. 12; however, the arrangement is not limited to thereto and may be circular.

The molding unit 101 molds a plastic material into the preform 10a. The molding unit 101 may be, for example, an injection molding unit that injects and molds a material. In this case, the molding unit 101 includes an injector 106 that melts and injects resin pellets and a molding die 107 that molds the material into the preform 10a. Alternatively, the molding unit 101 may be a compression molding unit producing the preform 10a through compression molding, or may be an injection compression molding unit producing the preform 10a through injection compression molding.

The plastic member attaching unit 102 places the plastic member 40a on the outside of the preform 10a into which the molding unit 101 has molded. The plastic member attaching unit 102 includes a holder 108 and an attaching part 109, the holder 108 holding the preform 10a, and the attaching part 109 holding the plastic member 40a and attaching the plastic member 40a to the preform 10a.

The illustrated plastic member attaching unit 102 attaches a single plastic member 40a to a single preform 10a; however, this is not restrictive and the plastic member attaching unit 102 may attach a plurality of plastic members 40a in a stack to a single preform 10a.

The attaching part 109 may loosely insert the plastic member 40a onto the preform 10a, and then a heating mechanism (not illustrated) may cause the plastic member 40a to heat-contract.

The heating unit 103, which includes a heating apparatus 51, e.g., a near-infrared heater, heats the preform 10a and the plastic member 40a so that the preform 10a and the plastic member 40a have a higher temperature suitable for blow molding.

The blow molding unit 104, which includes a blow molding die 50 and a stretching rod 110 for stretching the preform 10a and the plastic member 40a, performs blow molding on the preform 10a and the plastic member 40a so that the preform 10a and the plastic member 40a are integrally inflated.

The controller 105 controls the molding unit 101, the plastic member attaching unit 102, the heating unit 103, and the blow molding unit 104, as described above. In the illustrated example, a single controller 105 controls all the units; however, this is not restrictive. There may be disposed a plurality of the controllers 105, each of which may control one or more of the units, and signals may be exchanged among the controllers 105 or among the units.

Although not illustrated in the figure, the production apparatus 100 for the composite container may further include, for example, a cooling unit that cools the preform 10a (composite preform 70), a temperature regulating unit that adjusts the temperature of the preform 10a (composite preform 70), and a standby unit that keeps the preform 10a (composite preform 70) on standby prior to blow molding.

Downstream from the blow molding unit 104, a printing unit (not illustrated) may further be disposed for making a print on the plastic member 40 after blow molding. In this case, the printing unit may be integrated with the molding unit 101, the plastic member attaching unit 102, the heating unit 103, and the blow molding unit 104.

The vapor-deposited film 21 can be formed by using a conventionally known method such as the plasma CVD process, the PVD process (e.g., the ion plating process), or the sputtering process.

Figure 13:
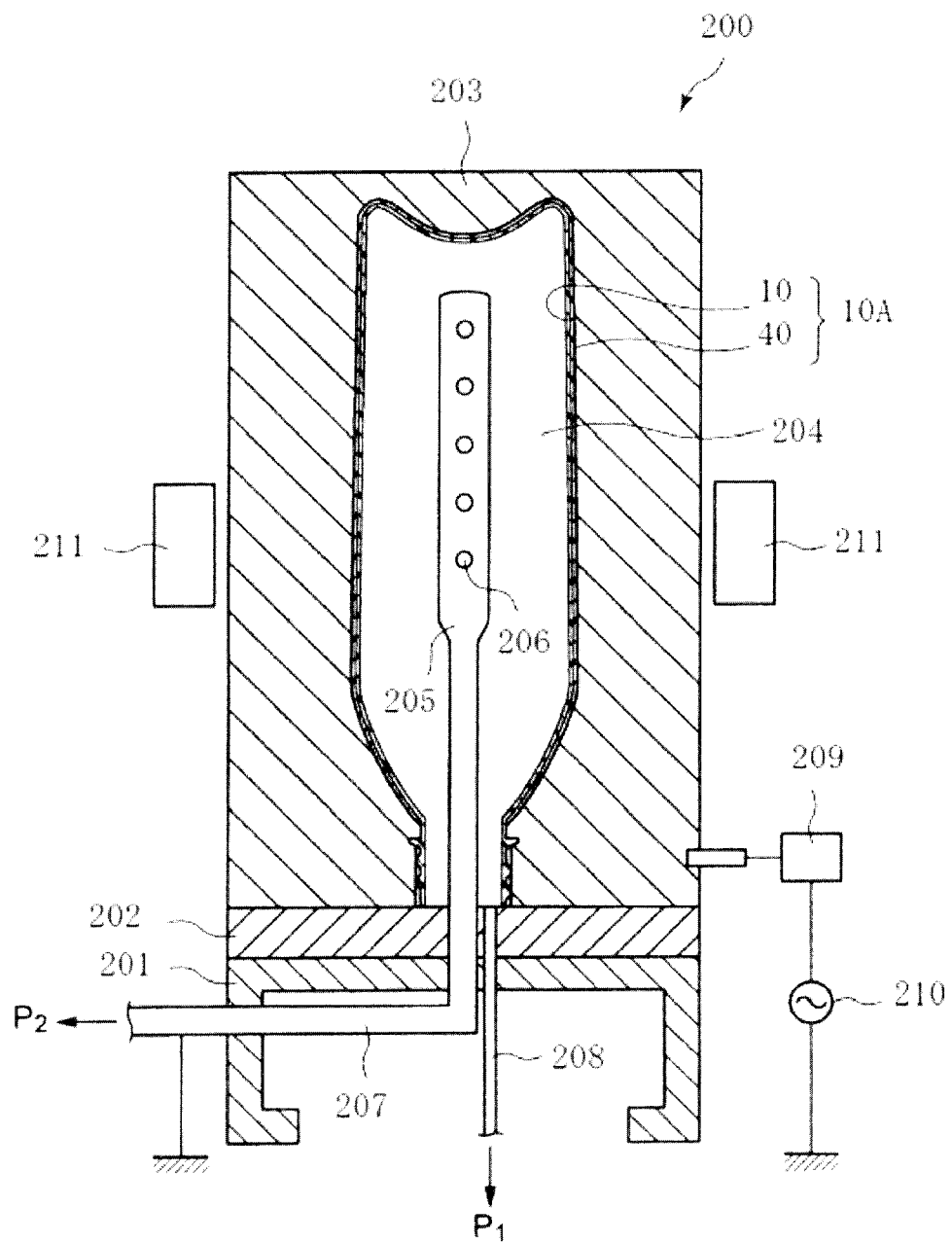
FIG. 13 is a schematic cross-sectional view illustrating a high-frequency plasma CVD apparatus.

Referring to FIG. 13, the following describes a method for forming the vapor-deposited film 21 by using the plasma CVD process.

First, configuration of a high-frequency plasma CVD apparatus 200 is described. The high-frequency plasma CVD apparatus 200 includes a substrate 201 and an external electrode 203 supported on the substrate 201 via an insulating plate 202.

In one embodiment, the external electrode 203 is made up of a plurality of members separable from one another so that the composite container 10A can be inserted and removed therethrough. The external electrode 203 includes a reaction chamber 204, which is a space larger to some extent than the composite container 10A.

In one embodiment, an internal electrode 205 is placed inside the reaction chamber 204. The internal electrode 205 is formed of a hollow body with a plurality of source gas outlet holes 206. A source gas supply pipe 207 formed of a conductive material is connected to the internal electrode 205. A vacuum source (not illustrated) is connected to the reaction chamber 204 via a discharge pipe 208.

A high-frequency power source 210 is connected to the external electrode 203 via a matching box 209. On the other hand, the internal electrode 205 is grounded via the source gas supply pipe 207. A plurality of magnets 211 are placed around the external electrode 203 so that a magnetic field is generated inside the reaction chamber 204.

As indicated by the arrow $P_2$, a source gas composition gas for vapor deposition prepared by using a monomer gas for vapor deposition such as an organosilicon compound, an oxygen gas, an inert gas, and others is fed to the source gas supply pipe 207 connected to the internal electrode 205. When fed to the internal electrode 205 through the source gas supply pipe 207, the source gas composition gas for vapor deposition blows out of the source gas outlet holes 206 disposed in the internal electrode 205.

As indicated by the arrow $P_1$, the reaction chamber 204 is configured to discharge air therein through the discharge pipe 208 by means of the vacuum source (vacuum pump).

To form the vapor-deposited film 21, the composite container 10A is placed inside the reaction chamber 204 in the external electrode 203. Then, air is discharged to increase the degree of vacuum by using the vacuum pump (not illustrated) connected to the discharge pipe 208 until the reaction chamber 204 is under a pressure suitable for producing a plasma.

Next, an inert gas such as argon (Ar) or helium (He) is supplied from the source gas supply pipe 207 to blow out of the source gas outlet holes 206 into the container body 10, while, at the same time, a high-frequency voltage is applied between the external electrode 203 and the internal electrode 205. As a result, a high-frequency glow discharge is generated inside the reaction chamber 204 while a magnetic field is generated inside the reaction chamber 204 by the magnets 211. The inert gas blowing out of the source gas outlet holes 206 is turned into a plasma in the reaction chamber 204, the plasma is then caused to collide against an inner surface of the container body 10 at an acceleration, creating fine irregularities on the inner surface of the container body 10. At the same time, a magnetic field is generated inside the reaction chamber 204 by the magnets 211, which provides the effects of creating a plasma of high-density and good-quality inert gas and causing a plasma of the inert gas to collide against an inner surface of the container body 10 at an acceleration, whereby fine irregularities can be efficiently formed on the inner surface of the container body 10.

Next, air is again discharged from the reaction chamber 204 to increase the degree of vacuum as described above by using the vacuum pump connected to the discharge pipe 208 until the reaction chamber 204 is under a pressure suitable for producing a plasma.

Then, a source gas composition for vapor deposition prepared by using a monomer gas for vapor deposition such as an organosilicon compound, an oxygen gas, an inert gas, and others is fed at an appropriate flow rate to the reaction chamber 204 through the source gas supply pipe 207. In addition, a high-frequency voltage is applied between the external electrode 203 and the internal electrode 205, thereby generating a high-frequency glow discharge inside the reaction chamber 204 while generating a magnetic field in the reaction chamber 204 with the magnets 211. The high-frequency glow discharge then causes the source gas composition for vapor deposition fed into the reaction chamber 204 to produce a vapor phase reaction in the reaction chamber 204, thereby creating a reaction product mainly composed of an inorganic oxide such as a plasma of silicon oxide. The reaction product is deposited on the entire inner surface of the container body 10 at an acceleration. At the same time, a magnetic field is generated inside the reaction chamber 204 by the magnets 211, which provides the effects of creating a plasma of a high-density and good-quality reaction product and causing a plasma of the reaction product to collide against an inner surface of the container body 10 at an acceleration, whereby the vapor-deposited film 21 can be efficiently deposited on the inner surface of the container body 10.

After a time long enough to form the vapor-deposited film 21 has passed, the source gas composition for vapor deposition is stopped from being supplied into the reaction chamber 204 through the source gas supply pipe 207, and then an atmosphere is introduced into the reaction chamber 204. In this way, the composite container 10A having the vapor-deposited film 21 deposited on the entire inner surface of the container body 10 is obtained.

Product Incorporating Composite Container 10A

Figure 14:
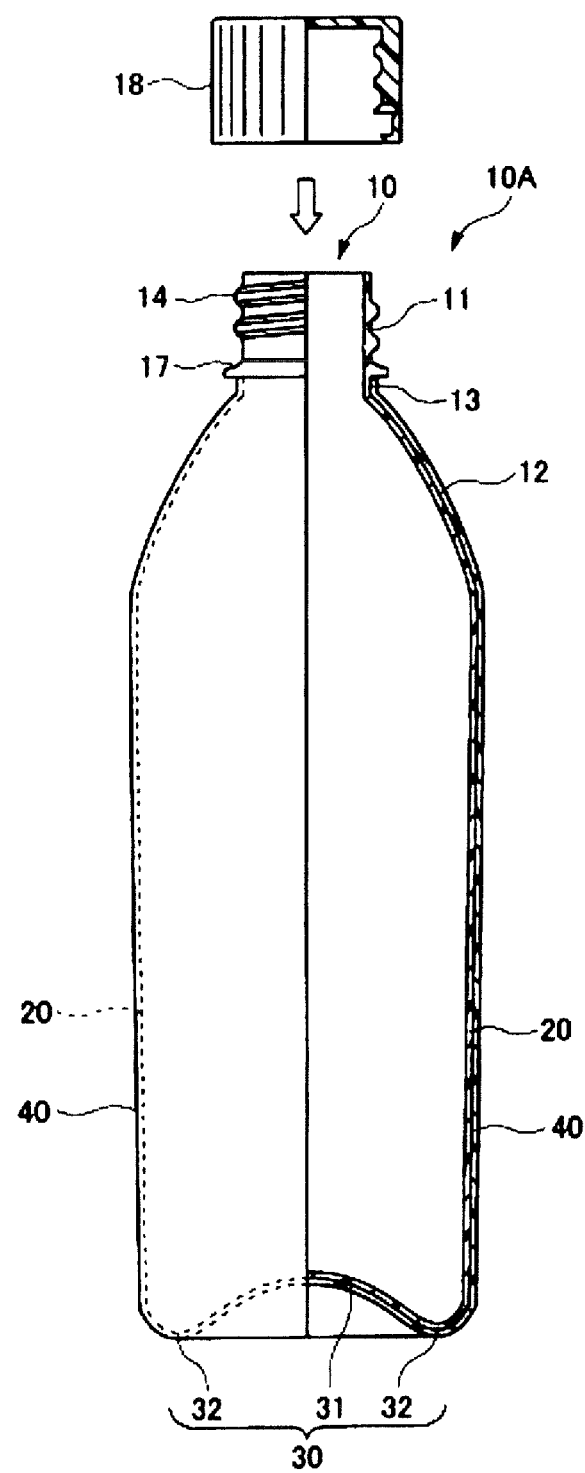
FIG. 14 is a partial vertical cross-sectional view illustrating a product incorporating the composite container according to one embodiment.

A product according to the present invention is the composite container 10A that is loaded with the contents, wherein a cap 18 is attached on the mouth part 11 of the container body 10 (see FIG. 14).

The cap 18 included in the product according to the present invention may be formed of an overcap to cover the flange part in the mouth part 11 of the container body. The cap 18 included in the product according to the present invention is an overcap having light-blocking properties, whereby the light-blocking properties and the storage stability of the contents can be further improved.

Figure 15:
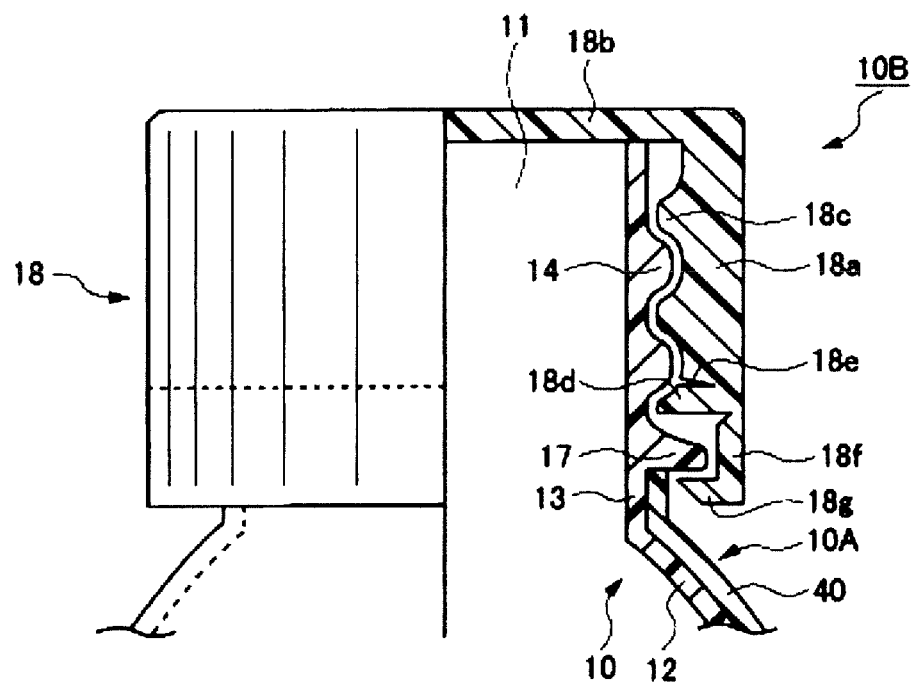
FIG. 15 is an enlarged and partial vertical cross-sectional view illustrating a mouth part and therearound of the product incorporating the composite container according to one embodiment.

In one embodiment, the mouth part 11 includes a screw part 14 onto which the cap 18 is to be attached and a flange part 17 disposed below the screw part 14. The aforementioned neck part 13 is disposed below the flange part 17, and the heat-contractive plastic member 40 extends up to the bottom face of the flange part 17 (see FIG. 15).

In one embodiment, the cap 18 includes a side wall 18a being substantially cylindrical and a top face 18b being connected to the upper end of the side wall 18a and substantially circular in plan view. On an inner surface of the side wall 18a, there are formed a screw part 18c, which is to engage with the screw part 14 of the mouth part 11, and an annular inner circumferential protrusion 18d, which is positioned below the screw part 18c. At an upper end of the inner circumferential protrusion 18d, there is formed a weakening line 18e, which is tearable when the cap 18 is loosened. On the bottom of the side wall 18a, there are formed a support ring 18f and an annular engaging projection 18g, which extends inward from the bottom of the support ring 18f. The engaging projection 18g engages with a bottom face of the flange part 17. Hence, when the cap 18 is loosened and the weakening line 18e is torn, the engaging projection 18g engages with the flange part 17, with the result that the support ring 18f stays on the mouth part 11. Note that the weakening line 18e is tearable as long as the inner circumferential projection 18d is disposed, irrespective of whether the engaging projection 18g engages with the flange part 17 or not. Thus, the engaging projection 18g may or may not engage with the flange part 17 (see FIG. 15).

In one embodiment, the cap 18 and/or the flange part 17 is covered by a light-blocking film. This configuration helps to further improve the light-blocking properties of the composite container 10A and the storage stability of the contents.

An opaque film having light-blocking properties is used as the light-blocking film. Examples of materials for the light-blocking film include polyethylene terephthalate (PET), polystyrene (PS), polypropylene (PP), and polyethylene (PE). The light-blocking film is preferably a cylindrical and heat-contractive film.

The contents filling the product according to the present invention are not specifically restricted. Thus, the product can be loaded with, in addition to beer as described above, alcoholic drinks such as Japanese sake and wine, cold beverages including sports drinks, vegetable juice, smoothies, and the like. The contents are not limited to drinks, and thus the product may be loaded with shampoo, conditioner, cosmetics, pharmaceuticals, and so on.

EXAMPLES

The present invention will now be described in more detail by way of Examples, although the present invention is not limited to these Examples.

Example 1-1

(Step of Preparing Preform 10a)

Figure 7:
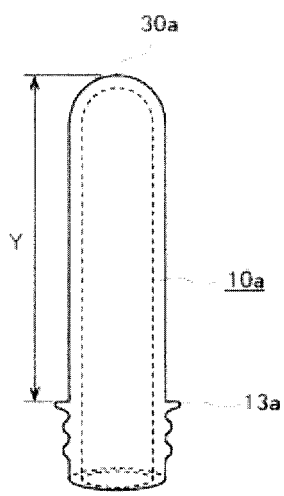
FIG. 7 is a front view of the preform.

The preform 10a made of PET and having a single-layer structure as illustrated in FIG. 7 was produced by using an injection molder. The weight and length Y of the preform 10a were 30.0 g and 90 mm, respectively.

(Step of Preparing Heat-Contractive Plastic Member 40a)

A resin composition containing polyethylene and a brown colorant, representing a polyolefin-based resin, was heated to be melted and extruded from a ring-shaped die. Next, the extruded tube was pressurized on its inner surface or a negative pressure was applied to the outer surface of the tube relative to the inner surface so that the diameter of the tube was expanded, thereby producing the heat-contractive plastic member 40a having a single-layer structure. The content of the brown colorant in the heat-contractive plastic member 40a was 1.5% by mass.

The near-infrared transmittance of the heat-contractive plastic member 40a was 64% as measured by using a spectrometer made by Hamamatsu Photonics.

The length X of the heat-contractive plastic member 40a was 100 mm.

(Fitting Step)

Next, the preform 10a was manually fitted into the heat-contractive plastic member 40a from one end thereof.

(Heat Contraction and Thermocompression-Bonding Step)

After the fitting, the preform 10a and the heat-contractive plastic member 40a were heated to 100° C. with a hot air dryer to cause the heat-contractive plastic member 40a to heat-contract. Then, the margin part 80a was thermocompression-bonded between metal plates heated to 100° C. at a pressure of 300 N/cm² to obtain the composite preform 70.

(Producing Composite Container)

The composite preform 70 obtained as above was heated to 100° C. by using a near-infrared heater and was transferred to the blow molding die illustrated in FIG. 11B. The composite preform 70 was blow molded in the blow molding die into the composite container 10A having a full capacity of 500 mL.

Next, the vapor-deposited film 21 made of silicon oxide was formed on the inner surface of the container body 10 by using the high-frequency plasma CVD apparatus 200 illustrated in FIG. 13. The thickness of the vapor-deposited film was 150 nm.

The visible light transmittance of the composite container 10A was 0.5% both at the trunk part and the bottom part, as measured by using a spectrophotometer (UV-Vis Spectrophotometer made by Shimadzu Corporation) for visible light having a wavelength of 400 to 500 nm.

The oxygen gas transmission rate of the composite container 10A was 0.12 cc/m²·day·0.21 atm, as measured in compliance with JIS K 7126 and using an oxygen transmission rate tester (a tester named OX-TRAN2/20 made by MOCON) under conditions of 23° C. and 90% RH humidity.

<Appearance Test>

The appearance of the produced composite container 10A was visually evaluated to find that no air bubble was present between the container body 10 and the plastic member 40 and that the bottom part 30 of the container body 10 was completely covered by the plastic member 40 with no peeling off or damage observed in the compression-bonded portion.

Comparative Example 1-1

The composite container 10A was produced in the same way as in Example 1-1 except that the brown colorant was not used in producing the heat-contractive plastic member 40a.

The visual light transmittance of the composite container 10A was 88% at the trunk part and the bottom part, and the oxygen transmission rate was 0.12 cc/m²·day·0.21 atm.

The appearance of the composite container was visually evaluated to find that no air bubble was present between the container body 10 and the plastic member 40 and that the bottom part 30 of the container body 10 was completely covered by the plastic member 40 with no peeling off or damage observed in the compression-bonded portion.

Comparative Example 1-2

The composite container 10A was produced in the same way as in Example 1-1 except that the margin part was not thermocompression-bonded.

The visual light transmittance of the composite container 10A was 0.5% at the trunk part and 88% at the bottom part that was not covered by the plastic member, and the oxygen transmission rate was 0.12 cc/m²·day·0.21 atm.

The appearance was visually evaluated to find that the bottom part 30 of the container body 10 was not covered by the plastic member 40.

Reference Example 1-1

The composite container 10A was produced in the same way as in Example 1-3 except that the vapor-deposited film was not provided on the inner surface of the container body 10.

The visual light transmittance was 0.5% at the trunk part and the bottom part, and the oxygen transmission rate was 1.3 cc/m²·day·0.21 atm.

The appearance of the composite container was visually evaluated to find that no air bubble was present between the container body 10 and the plastic member 40 and that the bottom part 30 of the container body 10 was completely covered by the plastic member 40 with no peeling off or damage observed in the compression-bonded part.

TABLE 1

| | | Example 1-1 | Comparative Example 1-1 | Comparative Example 1-2 | Reference Example 1-1 |
|---|---|---|---|---|---|
| Visible light transmittance (%) | Trunk part | 0.5 | 88 | 0.5 | 0.5 |
| | Bottom part | 0.5 | 88 | 88 | 0.5 |
| Oxygen transmission rate (cc/m² · day · 0.21 atm) | | 0.12 | 0.12 | 0.12 | 1.3 |
| Content fluid storage stability | Light resistance | ○ | x | Δ | ○ |
| | Oxygen barrier properties | ○ | ○ | ○ | x |

Example 2-1

(Step of Preparing Preform 10a)

The preform 10a made of PET and having a single-layer structure as illustrated in FIG. 7 was produced by using an injection molder. The weight and length Y of the preform 10a were 30.0 g and 90 mm, respectively.

(Step of Preparing Heat-Contractive Plastic Member 40a)

A resin composition for a colored layer containing a brown colorant and polyethylene, which is a polyolefin-based resin, and EVOH and an adhesive were coextruded from a ring-shaped die. Next, the extruded tube was pressurized on its inner surface or a negative pressure was applied to the outer surface of the tube relative to the inner surface so that the diameter of the tube was expanded, thereby producing the heat-contractive plastic member 40a having a structure formed of colored layer/adhesion layer/gas barrier layer (EVOH)/adhesion layer/colored layer.

The near-infrared transmittance of the heat-contractive plastic member 40a was 70% for 800 nm near-infrared rays, as measured by using a spectrometer made by Hamamatsu Photonics.

The length X of the produced heat-contractive plastic member 40a was 100 mm.

The content of the colorant in the colored layer was 5% by mass.

(Fitting Step)

Next, the preform 10a was manually fitted into the heat-contractive plastic member 40a from one end thereof.

(Heat Contraction and Thermocompression-Bonding Step)

After the fitting, the preform 10a and the heat-contractive plastic member 40a were heated to 100° C. with a hot air dryer to cause the heat-contractive plastic member 40a to heat-contract. Then, the margin part was thermocompression-bonded between metal plates heated to 100° C. at a pressure of 300 N/cm² to obtain the composite preform 70.

(Producing Composite Container)

The composite preform 70 obtained as above was heated to 100° C. by using a near-infrared heater and was transferred to the blow molding die illustrated in FIG. 11B. The composite preform 70 was blow molded in the blow molding die into the composite container 10A having a full capacity of 500 mL.

Next, the vapor-deposited film 21 made of silicon oxide was formed on the inner surface of the container body 10 by using the high-frequency plasma CVD apparatus 100 illustrated in FIG. 13. The thickness of the vapor-deposited film was 150 nm.

The visible light transmittance of the composite container 10A was 0.5% both at the trunk part and the bottom part, as measured by using a spectrophotometer (UV-Vis Spectrophotometer made by Shimadzu Corporation) for visible light having a wavelength of 400 to 500 nm.

The oxygen gas transmission rate of the composite container 10A was 0.060 cc/m²·day·0.21 atm, as measured in compliance with JIS K 7126 and using an oxygen transmission rate tester (a tester named OX-TRAN2/20 made by MOCON) under conditions of 23° C. and 90% RH humidity.

<Appearance Test>

The appearance of the produced composite container 10A was visually evaluated to find that no air bubble was present between the container body 10 and the plastic member 40 and that the bottom part 30 of the container body 10 was completely covered by the plastic member 40 with no peeling off or damage observed in the compression-bonded portion.

Comparative Example 2-1

The composite container 10A was produced in the same way as in Example 2-1 except that the brown colorant was not contained in the resin component for a colored layer.

The visual light transmittance of the composite container 10A was 88% at the trunk part and the bottom part, and the oxygen transmission rate was 0.060 cc/m²·day·0.21 atm.

The appearance of the composite container was visually evaluated to find that no air bubble was present between the container body 10 and the plastic member 40 and that the bottom part 30 of the container body 10 was completely covered by the plastic member 40 with no peeling off or damage observed in the compression-bonded portion.

Comparative Example 2-2

The composite container 10A was produced in the same way as in Example 2-1 except that the margin part was not thermocompression-bonded.

The visual light transmittance of the composite container 10A was 0.5% at the trunk part and 88% at the bottom part that was not covered by the plastic member, and the oxygen transmission rate was 0.060 cc/m²·day·0.21 atm.

The appearance was visually evaluated to find that the bottom part 30 of the container body 10 was not covered by the plastic member 40.

Reference Example 2-1

The composite container 10A was produced in the same way as in Example 2-1 except that the vapor-deposited film was not provided on the inner surface of the container body 10.

The visual light transmittance was 0.5% at the trunk part and the bottom part, and the oxygen transmission rate was 0.650 cc/m²·day·0.21 atm.

The appearance of the composite container was visually evaluated to find that no air bubble was present between the container body 10 and the plastic member 40 and that the bottom part 30 of the container body 10 was completely covered by the plastic member 40 with no peeling off or damage observed in the compression-bonded portion.

TABLE 2

| | | Example 2-1 | Comparative Example 2-1 | Comparative Example 2-2 | Reference Example 2-1 |
|---|---|---|---|---|---|
| Visible light transmittance (%) | Trunk part | 0.5 | 88 | 0.5 | 0.5 |
| | Bottom part | 0.5 | 88 | 88 | 0.5 |
| Oxygen transmission rate (cc/m² · day · 0.21 atm) | | 0.060 | 0.060 | 0.060 | 0.650 |
| Content fluid storage stability | Light resistance | ○ | x | Δ | ○ |
| | Oxygen barrier properties | ○ | ○ | ○ | x |

Example 3-1

(Step of Preparing Preform 10a)

The preform 10a in a shape illustrated in FIG. 7 and including the layers: layer made of PET/layer made of MXD-6 and pro-oxidant/layer made of PE (disposed in this order from innermost to outermost layers) was produced by using an injection molder. The content of the pro-oxidant therein was 1% by mass.

The weight and length Y of the preform 10a were 30.0 g and 90 mm, respectively.

(Step of Preparing Heat-Contractive Plastic Member 40a)

A resin composition for a colored layer containing a brown colorant and polyethylene, which is a polyolefin-based resin, and EVOH and an adhesive were coextruded from a ring-shaped die. Next, the extruded tube was pressurized on its inner surface or a negative pressure was applied to the outer surface of the tube relative to the inner surface so that the diameter of the tube was expanded, thereby producing the heat-contractive plastic member 40a including the layers: colored layer/adhesion layer/gas barrier layer (EVOH)/adhesion layer/colored layer, disposed in this order from innermost to outermost layers. The content of the brown colorant in the colored layer was 5% by mass.

The near-infrared transmittance of the heat-contractive plastic member 40a was 70% as measured by using a spectrometer made by Hamamatsu Photonics.

The length X of the produced heat-contractive plastic member 40a was 100 mm.

(Fitting Step)

Next, the preform 10a was manually fitted into the heat-contractive plastic member 40a from one end thereof.

(Heat Contraction and Thermocompression-Bonding Step)

After the fitting, the preform 10a and the heat-contractive plastic member 40a were heated to 100° C. with a hot air dryer to cause the heat-contractive plastic member 40a to heat-contract. Then, the margin part 80a was thermocompression-bonded between metal plates heated to 100° C. at a pressure of 300 N/cm$^2$ to obtain the composite preform 70.

(Producing Composite Container)

The composite preform 70 obtained as above was heated to 100° C. by using a near-infrared heater and was transferred to the blow molding die illustrated in FIG. 11B. The composite preform 70 was blow molded in the blow molding die into the composite container 10A having a full capacity of 500 mL.

In the container body 10, the gas barrier layer had a thickness of 10 μm while other layers (polyester-based resin layers) each had a thickness of 120 μm.

In the plastic member 40, the colored layers each had a thickness of 10 μm, the adhesion layers each had a thickness of 2 μm, and the gas barrier layer had a thickness of 5 μm.

The visible light transmittance of the composite container 10A was 0.5% both at the trunk part and the bottom part, as measured by using a spectrophotometer (UV-Vis Spectrophotometer made by Shimadzu Corporation) for visible light having a wavelength of 400 to 500 nm.

The oxygen gas transmission rate of the composite container 10A was 0.075 cc/m$^2$·day·0.21 atm, as measured in compliance with JIS K 7126 and using an oxygen transmission rate tester (a tester named OX-TRAN2/20 made by MOCON) under conditions of 23° C. and 90% RH humidity.

<Appearance Test>

The appearance of the produced composite container 10A was visually evaluated to find that no air bubble was present between the container body 10 and the plastic member 40 and that the bottom part 30 of the container body 10 was completely covered by the plastic member 40 with no peeling off or damage observed in the compression-bonded portion.

Comparative Example 3-1

The composite container 10A was produced in the same way as in Example 3-1 except that the brown colorant was not contained in the resin component for a colored layer.

The visual light transmittance of the composite container 10A was 88% at the trunk part and the bottom part, and the oxygen transmission rate was 0.075 cc/m$^2$·day·0.21 atm.

The appearance of the composite container was visually evaluated to find that no air bubble was present between the container body 10 and the plastic member 40 and that the bottom part 30 of the container body 10 was completely covered by the plastic member 40 with no peeling off or damage observed in the compression-bonded portion.

Comparative Example 3-2

The composite container 10A was produced in the same way as in Example 3-1 except that the margin part was not thermocompression-bonded.

The visual light transmittance of the composite container 10A was 0.5% at the trunk part and 88% at the bottom part that was not covered by the plastic member, and the oxygen transmission rate was 0.075 cc/m$^2$·day·0.21 atm.

The appearance was visually evaluated to find that the bottom part 30 of the container body 10 was not covered by the plastic member 40.

TABLE 3

| | | Example 3-1 | Comparative Example 3-1 | Comparative Example 3-2 |
|---|---|---|---|---|
| Visible light transmittance (%) | Trunk part | 0.5 | 88 | 0.5 |
| | Bottom part | 0.5 | 88 | 88 |
| Oxygen transmission rate (cc/m$^2$ · day · 0.21 atm) | | 0.075 | 0.075 | 0.075 |
| Content fluid storage stability | Light resistance | ○ | x | Δ |
| | Oxygen barrier properties | ○ | ○ | ○ |

Example 4-1

(Step of Preparing Preform 10a)

The preform 10a in a shape illustrated in FIG. 7 and including the layers: layer made of PET/layer made of MXD-6 and pro-oxidant/layer made of PET was produced by using an injection molder. The content of the pro-oxidant therein was 1% by mass.

The weight and length Y of the preform 10a were 30.0 g and 90 mm, respectively.

(Step of Preparing Heat-Contractive Plastic Member 40a)

A mixture containing a brown colorant and polyethylene, which is a polyolefin-based resin, was extruded from a ring-shaped die. Next, the extruded tube was pressurized on its inner surface or a negative pressure was applied to the outer surface of the tube relative to the inner surface so that the diameter of the tube was expanded, thereby producing the heat-contractive plastic member 40a having a single-layer structure.

The content of the brown colorant in the colored layer was 5% by mass.

The near-infrared transmittance of the heat-contractive plastic member 40a was 70% as measured by using a spectrometer made by Hamamatsu Photonics.

The length X of the produced heat-contractive plastic member 40a was 100 mm.

(Fitting Step)

Next, the preform 10a was manually fitted into the heat-contractive plastic member 40a from one end thereof.

(Heat Contraction and Thermocompression-Bonding Step)

After the fitting, the preform 10a and the heat-contractive plastic member 40a were heated to 100° C. with a hot air dryer to cause the heat-contractive plastic member 40a to heat-contract. Then, the margin part 80a was thermocompression-bonded between metal plates heated to 100° C. at a pressure of 300 N/cm$^2$ to obtain the composite preform 70.

(Producing Composite Container)

The composite preform 70 obtained as above was heated to 100° C. by using a near-infrared heater and was transferred to the blow molding die illustrated in FIG. 11B. The composite preform 70 was blow molded in the blow molding die into the composite container 10A having a full capacity of 500 mL.

In the container body 10, the gas barrier layer had a thickness of 30 μm while other layers (polyester-based resin layers) each had a thickness of 120 μm.

The Thickness of the plastic member 40 was 50 μm.

The visible light transmittance of the composite container 10A was 0.5% both at the trunk part and the bottom part, as measured by using a spectrophotometer (UV-Vis Spectrophotometer made by Shimadzu Corporation) for visible light having a wavelength of 400 to 500 nm.

The oxygen gas transmission rate of the composite container 10A was 0.51 cc/m$^2$·day·0.21 atm, as measured in compliance with JIS K 7126 and using an oxygen transmission rate tester (a tester named OX-TRAN2/20 made by MOCON) under conditions of 23° C. and 90% RH humidity.

<Appearance Test>

The appearance of the produced composite container 10A was visually evaluated to find that no air bubble was present between the container body 10 and the plastic member 40 and that the bottom part 30 of the container body 10 was completely covered by the plastic member 40 with no peeling off or damage observed in the compression-bonded portion.

Comparative Example 4-1

The composite container 10A was produced in the same way as in Example 4-1 except that the brown colorant was not used in producing the heat-contractive plastic member 40a.

The visual light transmittance of the composite container 10A was 88% at the trunk part and the bottom part, and the oxygen transmission rate was 0.51 cc/m$^2$·day·0.21 atm.

The appearance of the composite container was visually evaluated to find that no air bubble was present between the container body 10 and the plastic member 40 and that the bottom part 30 of the container body 10 was completely covered by the plastic member 40 with no peeling off or damage observed in the compression-bonded portion.

Comparative Example 4-2

The composite container 10A was produced in the same way as in Example 4-1 except that the margin part was not thermocompression-bonded.

The visual light transmittance of the composite container 10A was 0.5% at the trunk part and 88% at the bottom part that was not covered by the plastic member, and the oxygen transmission rate was 0.51 cc/m$^2$·day·0.21 atm.

The appearance was visually evaluated to find that the bottom part 30 of the container body 10 was not covered by the plastic member 40.

TABLE 4

|  |  | Example 4-1 | Comparative Example 4-1 | Comparative Example 4-2 |
| --- | --- | --- | --- | --- |
| Visible light transmittance (%) | Trunk part | 0.5 | 88 | 0.5 |
|  | Bottom part | 0.5 | 88 | 88 |

TABLE 4-continued

|  |  | Example 4-1 | Comparative Example 4-1 | Comparative Example 4-2 |
| --- | --- | --- | --- | --- |
| Oxygen transmission rate (cc/m$^2$·day·0.21 atm) |  | 0.51 | 0.51 | 0.51 |
| Content fluid storage stability | Light resistance | ○ | x | Δ |
|  | Oxygen barrier properties | ○ | ○ | ○ |

Example 5-1

(Step of Preparing Preform 10a)

The preform 10a made of PET and having a single-layer structure as illustrated in FIG. 7 was produced by using an injection molder. The weight and length Y of the preform 10a were 30.0 g and 90 mm, respectively.

(Step of Preparing Heat-Contractive Plastic Member 40a)

A mixture containing a brown colorant and polyethylene, which is a polyolefin-based resin, was heated to be melted and extruded from a ring-shaped die. Next, the extruded tube was pressurized on its inner surface or a negative pressure was applied to the outer surface of the tube relative to the inner surface so that the diameter of the tube was expanded, thereby producing the heat-contractive plastic member 40a.

The content of the brown colorant in the heat-contractive plastic member 40a was 1.5% by mass.

The near-infrared transmittance of the heat-contractive plastic member 40a was 64% as measured by using a spectrometer made by Hamamatsu Photonics.

The length X of the produced heat-contractive plastic member 40a was 100 mm.

(Fitting Step)

Next, the preform 10a was manually fitted into the heat-contractive plastic member 40a from one end thereof.

(Heat Contraction and Thermocompression-Bonding Step)

After the fitting, the preform 10a and the heat-contractive plastic member 40a were heated to 100° C. with a hot air dryer to cause the heat-contractive plastic member 40a to heat-contract. Then, the margin part was thermocompression-bonded between metal plates heated to 100° C. at a pressure of 300 N/cm$^2$ to obtain the composite preform 70.

(Producing Composite Container)

The composite preform 70 obtained as above was heated to 100° C. by using a near-infrared heater and was transferred to the blow molding die illustrated in FIG. 11B. The composite preform 70 was blow molded in the blow molding die into the composite container 10A having a full capacity of 500 mL.

The visible light transmittance of the composite container 10A was 0.5% both at the trunk part and the bottom part, as measured by using a spectrophotometer (UV-Vis Spectrophotometer made by Shimadzu Corporation) for visible light having a wavelength of 400 to 500 nm.

<Appearance Test>

The appearance of the produced composite container 10A was visually evaluated to find that no air bubble was present between the container body 10 and the plastic member 40 and that the bottom part 30 of the container body 10 was completely covered by the plastic member 40 with no peeling off or damage observed in the thermocompression-bonded portion.

Comparative Example 5-1

The composite container 10A was produced in the same way as in Example 5-1 except that the brown colorant was not used in producing the heat-contractive plastic member 40a.

The visual light transmittance of the composite container 10A was 88% both at the trunk part and the bottom part.

The appearance of the composite container was visually evaluated to find that no air bubble was present between the container body 10 and the plastic member 40 and that the bottom part 30 of the container body 10 was completely covered by the plastic member 40 with no peeling off or damage observed in the thermocompression-bonded portion.

Comparative Example 5-2

The composite container 10A was produced in the same way as in Example 5-1 except that the margin part was not thermocompression-bonded.

The visual light transmittance of the composite container 10A was 0.5% at the trunk part.

The appearance was visually evaluated to find that the bottom part 30 of the container body 10 was not covered by the plastic member 40.

TABLE 5

|  |  | Example 5-1 | Comparative Example 5-1 | Comparative Example 5-2 |
|---|---|---|---|---|
| Visible light transmittance (%) | Trunk part | 0.5 | 88 | 0.5 |
|  | Bottom part | 0.5 | 88 | 88 |
| Light blocking |  | ○ | x | Δ |

The invention claimed is:

1. A composite preform comprising:
   a preform comprising a mouth part, a trunk part linked to the mouth part, and a bottom part linked to the trunk part; and
   a heat-contractive plastic member disposed so as to surround an outside of the preform and comprising at least a colored layer that contains a resin material and a colorant,
   wherein the heat-contractive plastic member has a near-infrared transmittance of 50% or higher,
   wherein the near-infrared transmittance has a wavelength in a range of 800 nm to 2500 nm,
   wherein an inner surface of the heat-contractive plastic member is disposed in close contact with at least the trunk part of the preform, and an outer surface of the heat-contractive plastic member is located on an outermost surface of the composite preform,
   wherein the colored layer contains a polyolefin-based resin,
   wherein a specific gravity of the heat-contractive plastic member is less than 1,
   wherein the heat-contractive plastic member includes a bent part, a first facing surface and a second facing surface, wherein the bent part is formed along a shape of the preform, wherein the first facing surface and the second facing surface each project from the bent part in a direction away from the preform along a central axis direction of the preform, and wherein the first facing surface and the second facing surface are directly thermocompression-bonded, without the preform intervening therebetween, and integrated with each other, and
   wherein the colorant is a brown pigment and a content of the colorant is 0.1% to 30% by mass.

2. The composite preform according to claim 1, wherein the heat-contractive plastic member further comprises a gas barrier layer.

3. The composite preform according to claim 1, wherein the preform has a multi-layer structure comprising at least a gas barrier layer.

4. The composite preform according to claim 1, wherein the thermocompression-bonded portion of the heat-contractive plastic member is twisted to form a twisted part.

* * * * *